United States Patent
Itoh

[19]

[11] Patent Number: 5,835,242
[45] Date of Patent: Nov. 10, 1998

[54] COLOR IMAGE INPUT APPARATUS

[75] Inventor: Takanori Itoh, Yokohama, Japan

[73] Assignee: Ricoh Company, Ltd., Tokyo, Japan

[21] Appl. No.: 648,856

[22] Filed: May 16, 1996

[30] Foreign Application Priority Data

| May 19, 1995 | [JP] | Japan | 7-121980 |
| May 10, 1996 | [JP] | Japan | 8-116847 |

[51] Int. Cl.⁶ .............. H04N 1/46; G03F 3/08; G06K 9/00
[52] U.S. Cl. .......... 358/515; 358/518; 382/167
[58] Field of Search .................. 358/500, 501, 358/504, 505, 509, 510, 511, 512, 515, 518, 519, 520, 521, 522, 530; 382/162, 167

[56] References Cited

U.S. PATENT DOCUMENTS

| 4,060,829 | 11/1977 | Sakamoto | 358/523 |
| 4,127,871 | 11/1978 | Sakamoto | 358/518 |
| 4,985,759 | 1/1991 | Ito | 358/529 |
| 4,989,079 | 1/1991 | Ito | 358/529 |
| 4,989,080 | 1/1991 | Ito | 358/517 |
| 5,155,587 | 10/1992 | Itoh | 358/515 |

FOREIGN PATENT DOCUMENTS

| 5-136993 | 6/1993 | Japan | H04N 1/40 |

OTHER PUBLICATIONS

English–language abstract of Japanese Patent Laid–Open Application No. 5–136993(A), publication date unknown.

*Primary Examiner*—Kim Yen Vu
*Assistant Examiner*—Kimberly A. Williams
*Attorney, Agent, or Firm*—McDermott, Will & Emery

[57] ABSTRACT

The color image input apparatus according to the present invention comprises a document illuminating means for illuminating a document; a color separating means for subjecting reflected light from the document illuminated by said document illuminating means to color separation; a document reading means for receiving the reflected light subjected to color separation by said color separating means, subjecting the reflected light to photoelectric conversion and reading the light as an image signal; a color material determining means for determining a type of a color material used for the document according to the image signal read by said image reading means; and a color correction processing means for subjecting the image signal read by said image reading means to a color correction processing according to a result of determination of said color material determining means.

21 Claims, 18 Drawing Sheets

F I G. 1 4
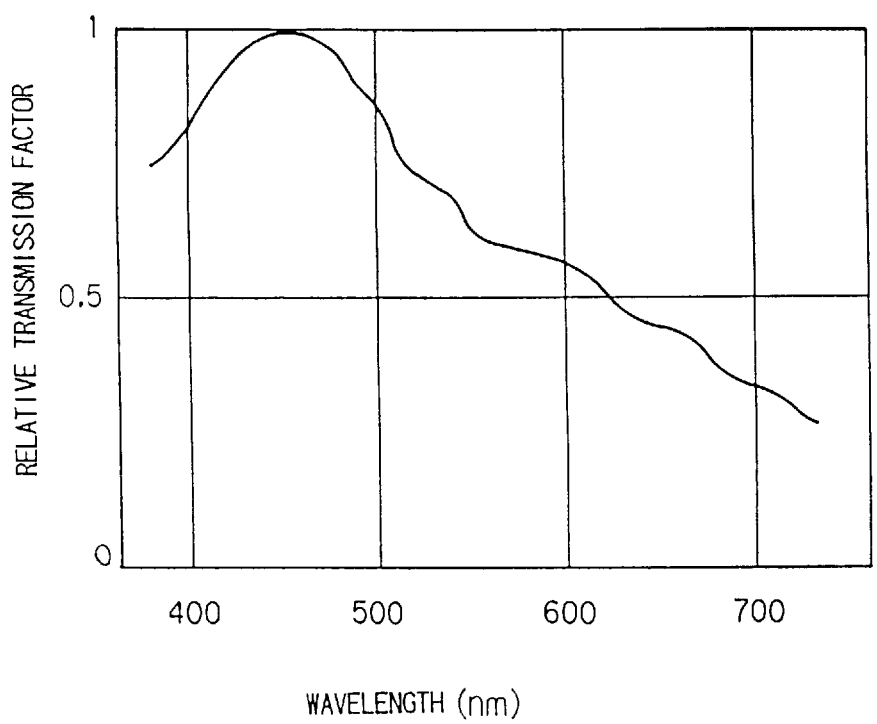

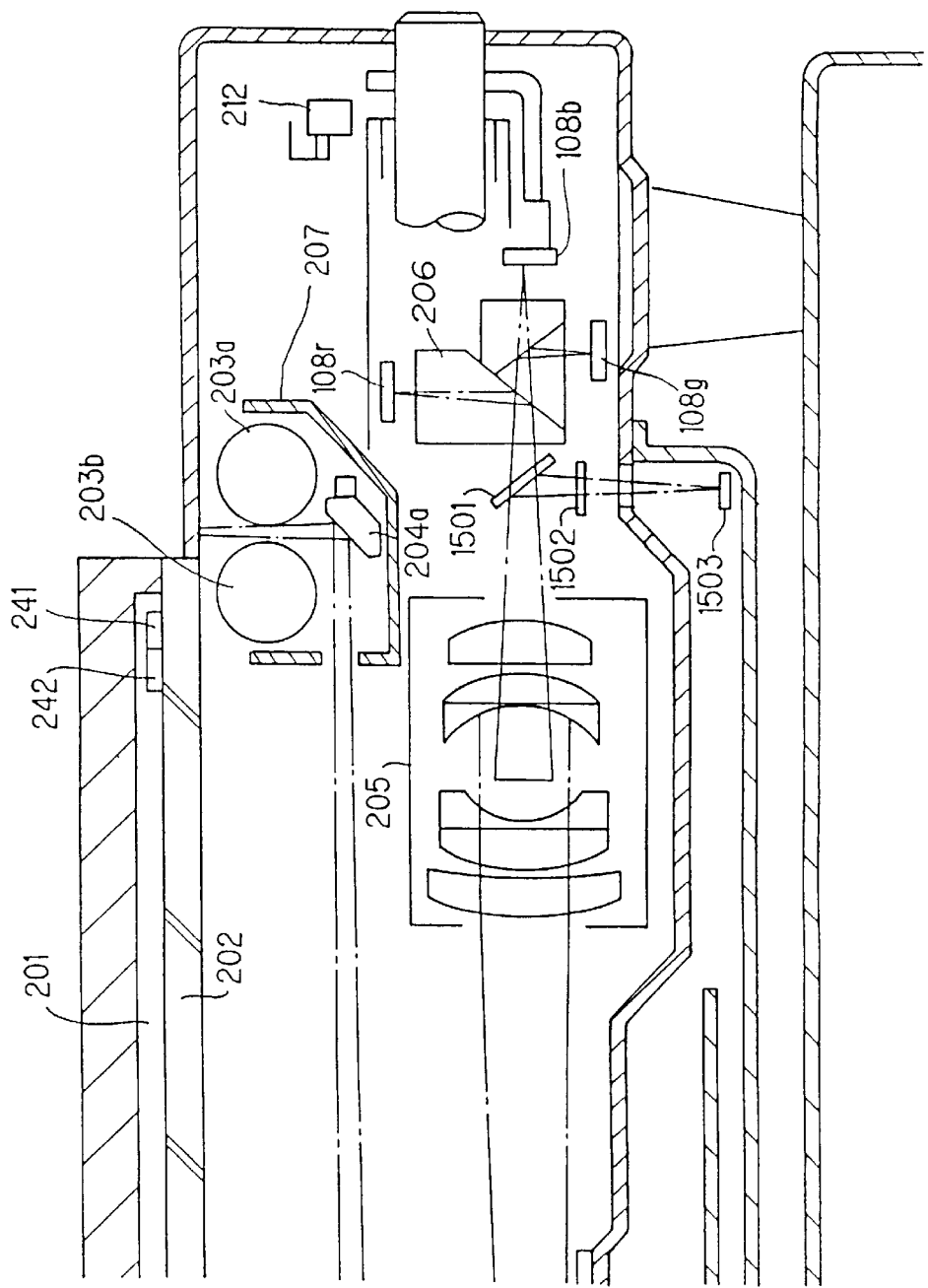

F I G. 1 6
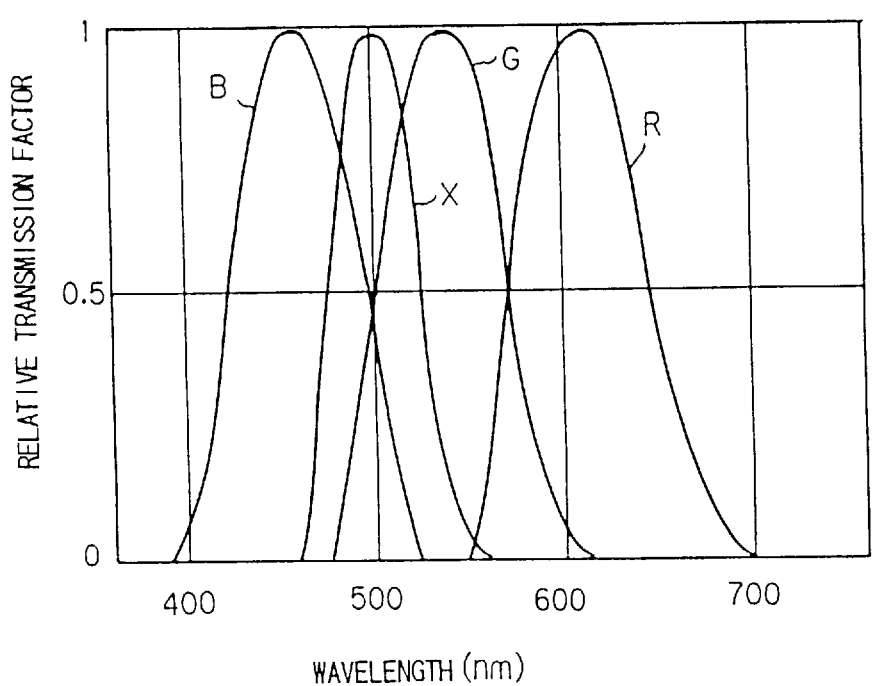

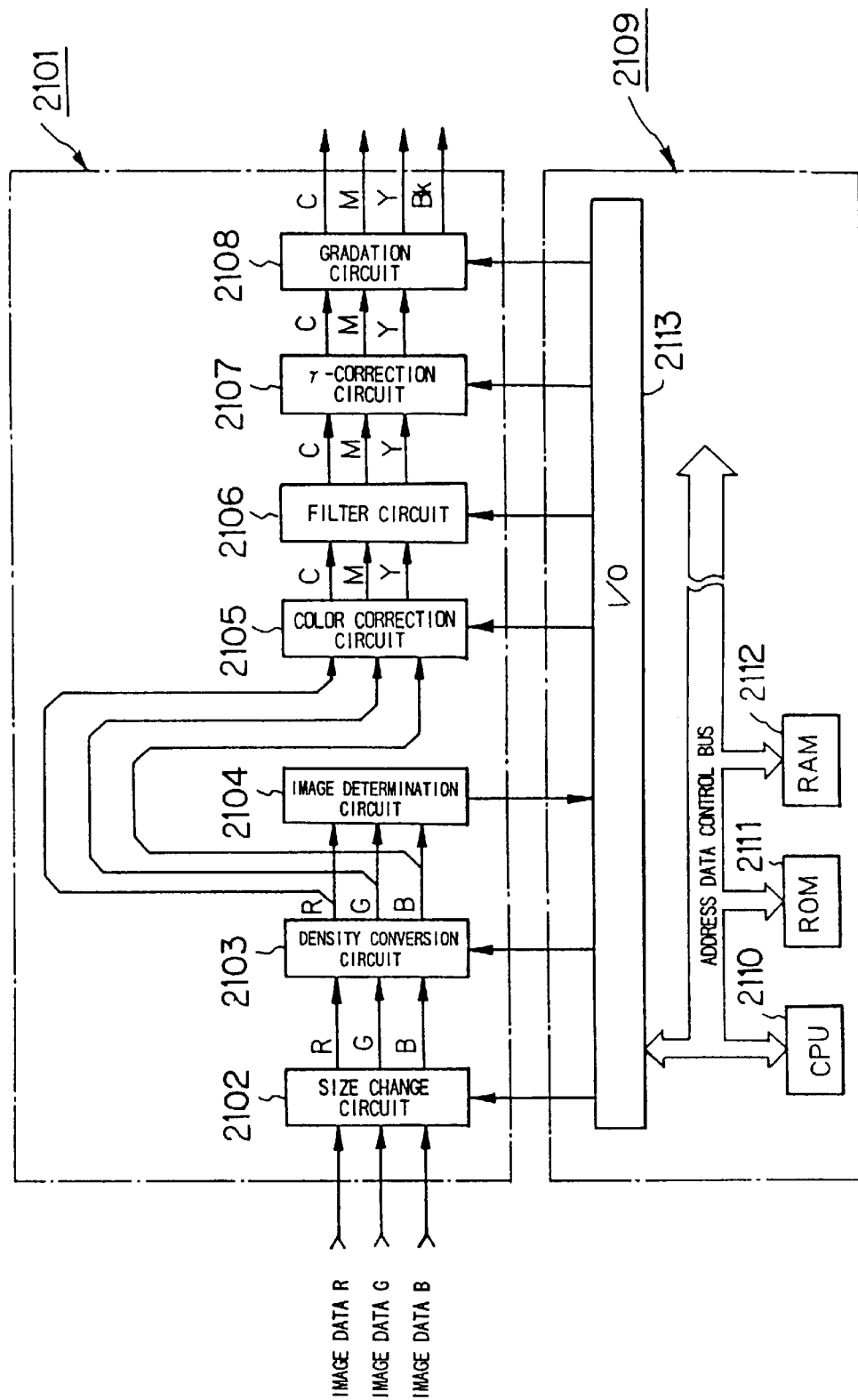

COLOR IMAGE INPUT APPARATUS

FIELD OF THE INVENTION

The present invention relates to a color image input apparatus for executing a different type of image processing according to a type of a document, and more particularly to a color image input apparatus for executing an optimal color correction processing according to a coloring stuff used on a document.

BACKGROUND OF THE INVENTION

As a color image input apparatus based on the conventional technology, there is, for instance, the one disclosed in Japanese Patent Laid-Open Publication No. 136993/1993, "Digital Color Image Processing Apparatus". This apparatus has, as shown in FIG. 21 showing a block diagram thereof, an image processing section 2101 for executing various types of image processing, and a system control section 2109 for controlling each section in the image processing section 2101, and the image processing section 2101 comprises a size change circuit 2102, a density conversion circuit 2103, an image determination circuit 2104, a color correction circuit 2105, a filter circuit 2106, a γ-correction circuit 2107, and a gradation circuit 2108.

Herein the size change circuit 2102 is a circuit for subjecting image signals R, G, and B read by a scanner unit (not shown herein) to a size change processing in the main scanning direction and outputting the processed signals. The density conversion circuit 2103 is a circuit which converts an image signal outputted from the size change circuit 2102 to an image signal proportional to the image density and outputs the converted signal. The image determination circuit 2104 is a circuit which determines whether a type of a read document is a printed photograph or a photograph document (silver salt photograph) according to the image signal outputted from the density conversion circuit 2103.

The color correction circuit 2105 is a circuit which subjects an image signal outputted from the density conversion circuit 2103 to a color correction processing according to the color phase and outputs the processed signal. The filter circuit 2106 is a circuit which subjects to an image signal outputted from the color correction circuit 2105 to a space filter processing and outputs the processed signal. The γ-correction circuit 2107 corrects an image signal outputted from the filter circuit 2106 according to the gradation record characteristics due to the gradation circuit 2108 or a printer unit (not shown) and outputs the corrected signal. The gradation circuit 1808 is a circuit which subjects an image signal outputted from the γ-correction circuit 2107 to a gradation processing such as the dither method and outputs the processed signal.

An ink-element extracting circuit is included in the block shown as the gradation circuit 2108, and the circuit extracts a black record element according to cyan (C), magenta (M), and yellow (Y) signals and outputs the black record element as a black signal (BK). The C, M, Y, and BK signals are sent to a printer unit.

The system control section 1809 comprises a CPU 2110, a ROM 2111, a microcomputer comprising a RAM 2112 and an I/O port 2113.

With the configuration described above, next description is made for a method of automatically making determination as to a type of a document in the above-described apparatus (determination as to whether a document is a printed photograph or a photograph document (such as a silver salt photograph). When comparing a printed photograph to a document photograph, we can notice the following three features.

① In most cases, a printed photograph may have been subjected to a screen tone processing, while a photograph document is never subjected to a screen tone processing.

② In a photograph document, the image density changes continuously, and there are few sharp image edges, but in a printed photograph, there are edges caused by the screen tone processing or those of characters and diagrams.

③ In the two extreme density areas such as a base surface section or a section entirely painted with a signal color, there is no difference of characteristics between a printed photograph and a photograph document.

For this reason, the three features described above are utilized in the method of automatically determining a type of a document. In other words, if many screen dots are detected in an intermediate density section other than the base surface section or the section entirely painted with a single color, the image is determined as a printed photograph by the image determination circuits 2104, and if few screen dots are detected there, the image is determined as a photograph document. Also, the image determination circuit 1804 determines the image as a printed photograph if many image edges are detected in an intermediate density area other than the base surface section or the section entirely painted with a single color, and as a photograph document if few edges are detected there.

As described above, a type of a document can automatically be determined, and a different type of color correction processing can be executed to an image signal according to the type of the document, and for this reason when a photograph document is copied, the photograph can be regenerated to that having desired colors without executing any specific adjusting work.

In Japanese Patent Laid-Open Publication No. 136993/1993, however, a read image signal can be subjected to a different type of color correction processing according to a type of a document, but as the spectrographic characteristics of color material used on a silver salt photograph document may vary according to a type of printing paper, if the deviation from the spectrographic characteristics assumed as the standard is large, sometimes a faithful color regeneration is impossible.

Also even in a case of a screen tone photograph document, particular ink (color material) used therein may make it impossible to faithfully regenerate the color due to the spectrographic characteristics of the ink (color material).

SUMMARY OF THE INVENTION

It is an object of the present invention to provide a color image input apparatus in which the improved color reproducibility is insured by executing an optimal color correction processing according to a type of color material used for the document.

In a color image input apparatus according to the present invention, a color separating means subjects reflected light from a document illuminated by a document illuminating means to color separation; an image reading means subjects the reflected light having been subjected to color separation to photoelectric conversion and reads the converted light as an image signal; a color material determining means determines a type of a color material used for the document according to the read image signal; and a color correction processing means executes, according to a result of the color material determining means, an optimal color correction processing to the image signal read by the image reading means according to a type of a color material used for the document.

In a color image input apparatus according to the present invention, when a document illuminating means having a plurality of illumination sources each driven independently and having different illuminating characteristics illuminated a document, a color separating means subjects reflected light from the document illuminated by the document illuminating means to color separation; an image reading means receives the reflected light having been subjected to color separation by the color separating means and subjects the reflected light to photoelectric conversion, reads the converted light as an image signal; and a color material determining means determines a type of a color material used for the document according to a plurality of image signals read by the image reading means by means of driving the plurality of illumination sources independently; and a color correction processing means executes a color correction processing to the image signal read by the image reading means according to a result of determination by the color material determining means.

In a color image input apparatus according to the present invention, when a document illuminating means having an illumination source which can emit light in a plurality of driving modes each having different light-emitting characteristics illuminates a document, a color separating means subjects reflected light from the document illuminated by the document illuminating means to color separation; an image reading means receives the reflected light having been subjected to color separation by the color separating means and subject the reflected light to photoelectric conversion and reads the converted light as an image signal; a color material determining means determines a type of a color material used for the document according to a plurality of image signals read by the image reading means by means of making the illumination source emit light in a plurality of driving mode; and a color correction processing means executes a color correction processing to the image signals read by the image reading means according to a result of determination by the color material determining means.

In a color image input apparatus according to the present invention, when a document illuminating means illuminates a document, a color separating means subjects reflected light for the document illuminated by the document illuminating means to color separation in a plurality of color separation mode each having different spectrographic characteristics; an image reading means receives the reflected light having been subjected to color separation by the color separating means and subject the reflected light to photoelectric conversion and reads the converted light as an image signal; a color material determining means determines a type of a color material used for the document according to the plurality of image signals read by the image reading means using the plurality of color separation mode; and a color correction processing means executes a color correction processing to the image signals read by the image reading means according to a result of determination by the color material determining means.

In a color image input apparatus according to the present invention, when a document illuminating means illuminates a document, a color separating means subjects reflected light from the document illuminated by the document illuminating means to color separation; also a spectrographic means subjects the reflected light from the document illuminated by the document illuminating means to spectrography with spectrographic characteristics different from that of the color separating means; an image reading means receives the reflected light having been subjected to color separation by the color separating means and subject the reflected light to photoelectric conversion and reads the converted light as an image signal; a color material determining means determines a type of a color material used for the document according to the image signal read by the image reading means; and a color correction processing means executes a color correction processing to the image signals read by the image reading means according to a result of determination by the color material determining means.

Other objects and features of this invention will become understood from the following description with reference to the accompanying drawings.

BRIEF DESCRIPTION OF THE DRAWINGS

FIG. 14 is an explanatory view showing a relative transmission factor in Embodiment 4;

FIG. 15 is a block diagram showing a digital copying machine according to Embodiment 5 of the present invention, in which a document is read by separating the document image into 4 colors;

FIG. 16 is an explanatory view showing a relative transmission factor in Embodiment 5;

FIG. 21 is a block diagram showing a color image input apparatus based on the conventional technology.

DESCRIPTION OF THE PREFERRED EMBODIMENTS

Next, a detailed description is made for Embodiments 1, 2, 3, 4 and 5 as examples, in each of which the color image input apparatus according the present invention is applied to a digital copying machine, with reference to the related drawings.

Figure 1:
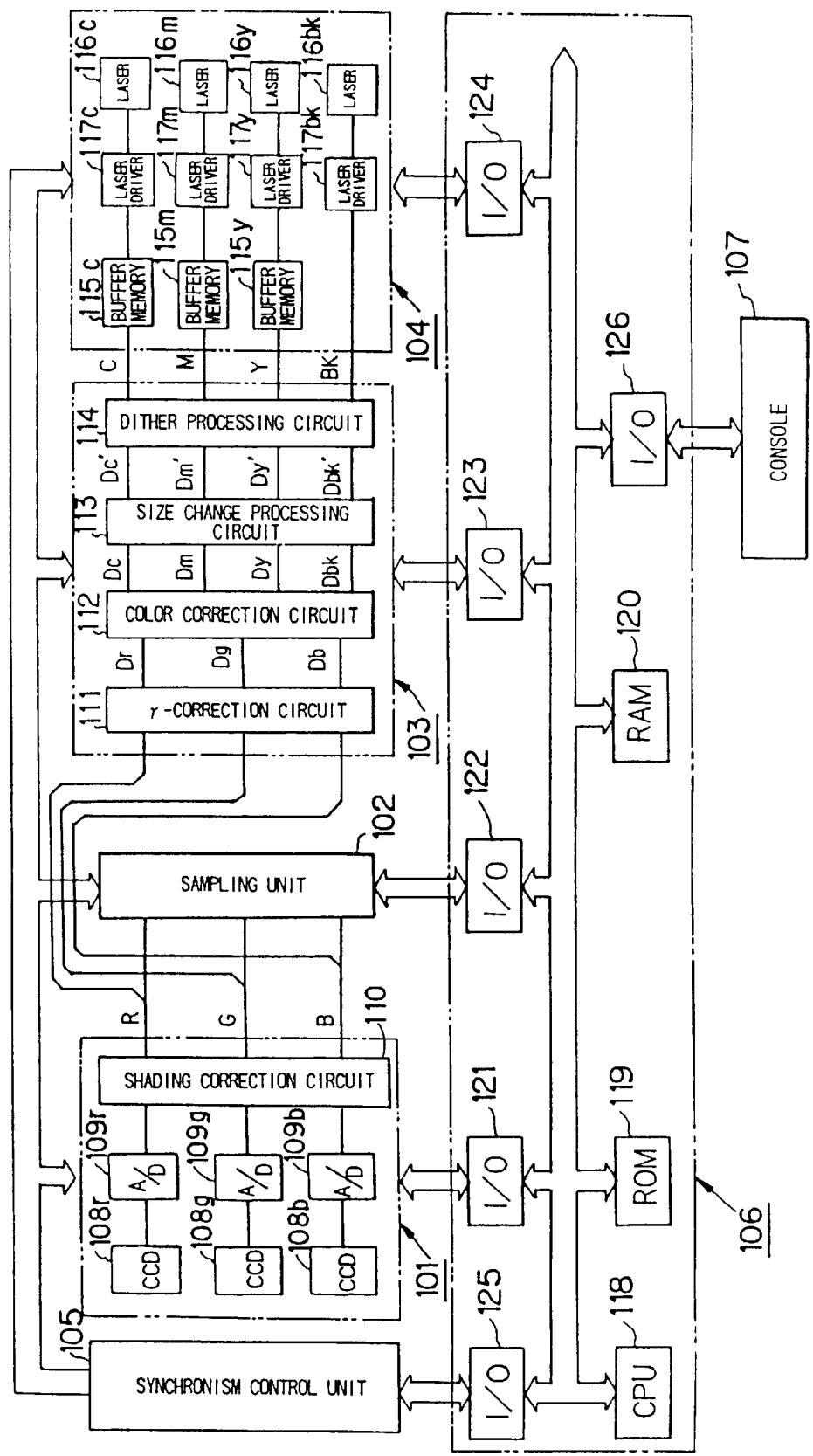
FIG. 1 is a block diagram showing a digital copying machine in which a color image input apparatus according to Embodiment 1 of the present invention is applied.

FIG. 1 is a block configuration view showing a digital copying machine according to Embodiment 1 of the present invention, and the digital copying machine comprises a read/processing unit 101 for reading a document image and outputting read color gradation signals red (R), green (G), and blue (B), a sampling unit 102 for sampling the read color gradation signals R, G, B of the document image read by the read/processing unit 101, an image processing unit 103 for receiving read color gradation signals R, G, B from the read/processing unit 101 and subjecting the signals to various types of image processing, an image recording unit 104 for outputting the image data having been subjected to image processing by the image processing unit 103 to recording paper, a synchronism control unit 105 for providing controls over timing synchronism in signal transaction among the read/processing unit 101, sampling unit 102, image processing unit 103, and image recording unit 104 as well as among each element in each unit, a system control unit 106 for providing controls over the entire digital copying machine and also functioning as the color material determining means according to Embodiment 1; and a console board 107 having a display section and a key section and used for operations of the entire digital copying machine.

Next description is made for minute configuration of the read/processing unit 101, image processing unit 103, image recording unit 104, and system control unit 106 with reference to the related drawings.

At first the read/processing unit 101 comprises CCDs 108r, 108g, and 108b for receiving reflected lights corresponding to R, G, and B separated by a dichroic prism 206 which is a color separating means described later respectively, subjecting the lights to photoelectric conversion, and reading the converted lights as image signals, A/D converters 109r, 109g and 109b converting the image signals (herein analog signals) read by the CCDs 108r, 108g and 108b to digital signals, and a shading correction circuit 110 for receiving the image signals converted by the A/D converters 109r, 109g, and 109b to digital signals and executing shading correction to the image signals.

The image processing unit 103 comprises a γ-correction circuit for subjecting read color gradation signals R, G, B inputted thereto to logarithmic conversion, a color correction circuit 112 for executing a masking processing and also functioning as the color correcting means in Embodiment 1, a size change processing circuit 113 for executing a size change processing to the read color gradation signals R, G, B, and a dither processing circuit 114 for executing a dither processing according to the signals having been subjected to a size change processing by the size change processing circuit 113.

The image recording unit 104 comprises a buffer memory 115 for storing therein each record color gradation signal inputted from the image processing unit 103, a semiconductor laser 116, and a laser driver 117 for driving the semiconductor laser 116.

It should be noted that the buffer memory 115 has buffer memories 115c, 115m, and 115y for the record color gradation signals cyan (C), magenta (M), and yellow (Y) corresponding to recording densities of each toner respectively. Also the semiconductor 116 has, like the buffer memory 115, semiconductors 116c, 116m, 116y and 116bk for record color gradation signals C, M, and Y as well as for black (BK), which is a fourth color element. Also the laser driver 117 has, like the semiconductor laser 116, laser drivers 117c, 117m, 117y, and 117bk for the record color gradation signals C, M, Y and BK.

Furthermore, the system control unit 106 comprises a CPU 118 for controlling the entire digital copying machine, a ROM 119, a RAM 120, an I/O port 121 for connection with the read/processing unit 101, an I/O port 122 for connection with the sampling unit 102, an I/O port 123 for connection with the image processing unit 103, an I/O port 124 for connection with the image recording unit 104, an I/O port 125 for connection with the synchronism control unit 105, and an I/O port 126 for connection with the console board 107. In other words, the system control unit 106 is a microcomputer. Also the system control unit 106 executes specified controls and operations according to a display control by and a key entry in the control board 107 described later.

With the configuration described above, next description is made for operations thereof. Description is made in the order of the read/processing unit 101, sampling unit 102, image processing unit 103, image recording unit 104, system control unit 106, and console board 107.

In the read/processing unit 101, the CCDs 108r, 108g and 108b read a document in relation to respective colors, and issue output signals R, G, and B. The signals outputted from the CCD 108r, 108g, and 108b are converted by the A/D converters 109r, 109g and 109b to a 10-bit digital signal respectively, and are inputted to the shading correction circuit 103. The shading correction circuit 103 corrects non-uniformity in a read optical system of the CCD 108, non-uniformity in sensitivity of each light receiving element group in each of the CCDs 108r, 108g and 108b, and dark potentials, and outputs read color gradation signals R, G and B each comprising 10 bits.

The sampling unit 102 samples the read color gradation signals R, G and B inputted from the read/processing unit 101 at a specific timing previously set, for instance, at a lattice point when a document is divided into zones with an equally spaced lattice. It is desirable for the sampling unit 102 to execute sampling after noise included in the read color gradation signals R, G and B is removed by executing, for instance, a smoothing processing to prevent incorrect determination on a type of a color material described later.

Then in the image processing unit 103, the γ-correction circuit 111 executes logarithmic conversion to the inputted read color gradation signals R, G and B and also corrects the gradation characteristics according to an instruction from the console board 107, and outputs 8-bit read color density signals Dr, Dg and Db for R, G and B respectively.

Then, the color correction circuit 112 executes a masking processing, and converts the read color density signals Dr, Dg, and Db, which are input signals, to signals Dc, Dm, Dy and Dbk corresponding to record colors of C, M, Y and BK (also corresponding to a recording density of each toner) according to the read color gradation signals R, G, and B. In the conversion executed by the color correction circuit 112, basic color correction to correct deviation of the recording characteristics of the digital copying machine in Embodiment 1 from the idealistic characteristics, arbitrary color correction according to an instruction from the console board 107, and furthermore color correction, of which the details is described later, according to a type of a color material used for a document in Embodiment 1 are executed.

The record color density signals Dc, Dm, Dy, and Dbk each comprising 8 bits outputted from the color correction circuit 112 are loaded to the size change processing circuit 113. The size change processing circuit 113 executes a size change processing in the main scanning direction (a direction perpendicular to the moving direction of a first carriage 207 described later) to a signal for each color according to an instruction from the console board 107, and outputs 8-bit record color density signals Dc', Dm', Dy' and Dbk'. It should be noted that size change in the auxiliary scanning direction (in the direction in which the first carriage 207 moves) is executed by changing the moving speed of the first carriage 207.

The signals outputted from the size change processing circuit 113 are loaded to the dither processing circuit 114. The dither processing circuit 114 subjects each of the record density signals Dc', Dm', Dy' and Dbk' to a dither processing, and outputs 3-bit record color gradation signals C, M, Y and BK. It should be noted that, in the dither processing executed by the dither processing circuit 114, also non-linear correction to gradation in the recording system is executed.

The semiconductor lasers 116c, 116m, 116y and 116bk are energized according to the record color gradation signals C, M, Y and BK outputted from the image processing unit 103. It should be noted that, although the record color gradation signal BK is directly given to the laser driver 117bk as it is, the record color gradation signals C, M and Y are once stored in the buffer memories 115y, 115m and 115c, then read out with prespecified time delays Ty, Tm, and Tc from the buffer memories 115y, 115m and 115c, and given to the laser drivers 117y, 117m and 117c.

Figure 2:
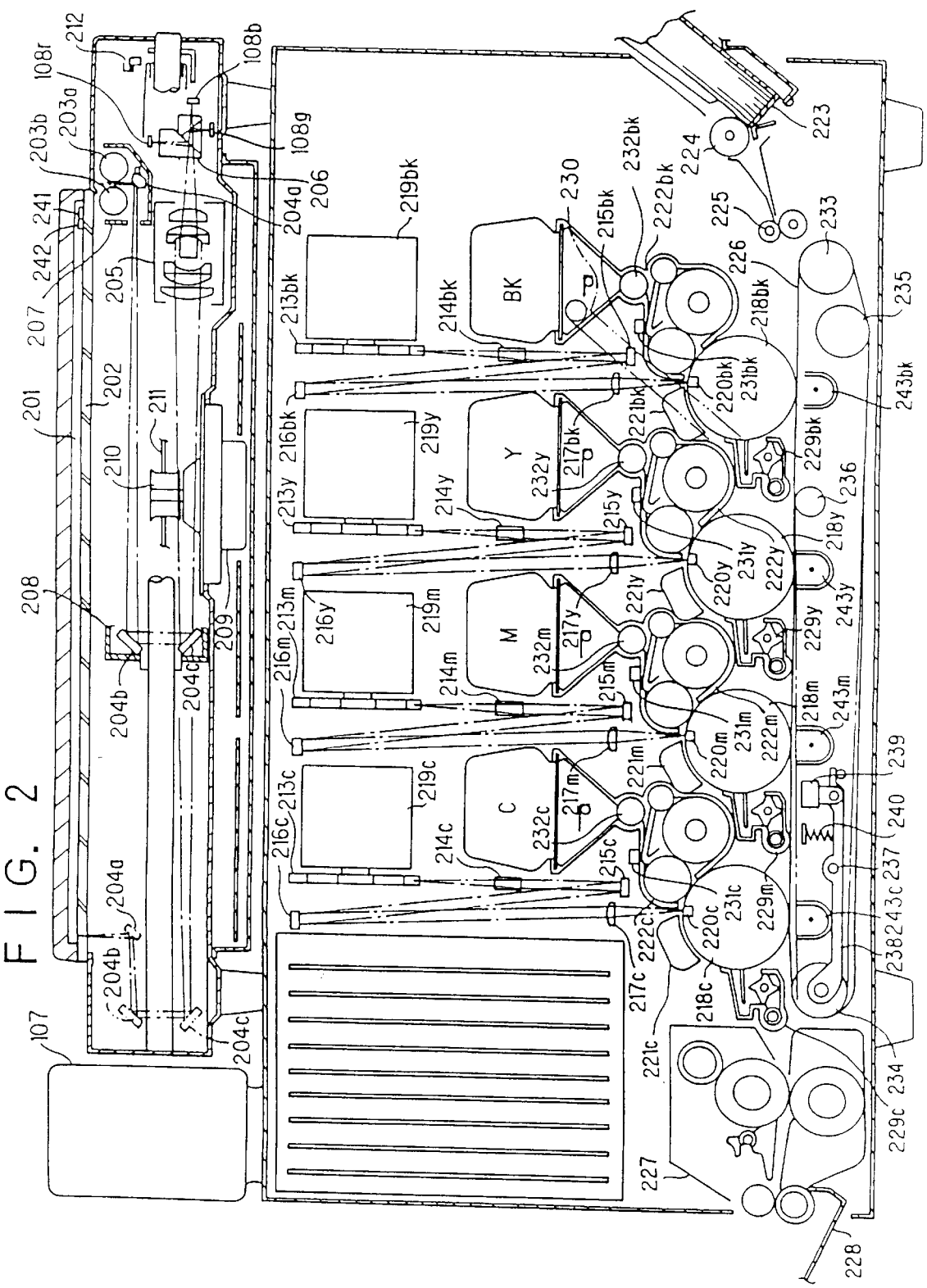
FIG. 2 is an explanatory view showing basic configuration and operations of the digital copying machine according to Embodiment 1.

Next description is made for basic configuration and operations of a digital copying machine with reference to FIG. 2. A document 201 is placed on a contact glass 202 and is illuminated by halogen lamps 203a, 203b which are document illuminating means according to Embodiment 1 of the present invention. Reflected light generated when the halogen lamps illuminate the document 201 is reflected by movable first mirror 204a, a second mirror 204b, and a third mirror 204c, and enters a dichroic mirror 206, which is a color separating means according to Embodiment 1, via a focusing lens 205.

In the dichroic prism 206, the reflected light is separated to three types of light each having a different wavelength, namely red (R), green (G) and blue (B). The separated lights are introduced into the CCDs 108r, 108g, and 108b, which are charge coupled devices (CCDs). As described above, of the separated lights introduced into the CCDs above, the red light is introduced into the CCD 108r, the green light into CCD 108g, and blue light into the CCD 108b respectively.

The halogen lamps 203a, 203b, and first mirror 204a are mounted in the first carriage 207, while the second mirror 204b and third mirror 204c are mounted in the second carriage 208. Because the second carriage 208 moves at a speed which is a half of that of the first carriage 207, the light path length from the document 201 to the CCD is kept at a constant value, and when a document is read, the first carriage 207 and second carriage 208 scan from right to left. The first carriage 207 is connected to a carriage driving wire 211 wound around a carriage driving pulley 210 fixed to a shaft of a carriage driving motor 209, and the carriage driving wire 211 is also wound around a pulley (not shown) on the second carriage 208. With this configuration, when the carriage driving motor 209 rotates in the regular direction or the reverse direction, the first carriage 207 and second carriage 208 move in the regular direction (scanning for reading a document image) or in the reverse direction (return), and the second carriage 208 moves at a speed which is a half of that of the first carriage 207.

Figure 3:
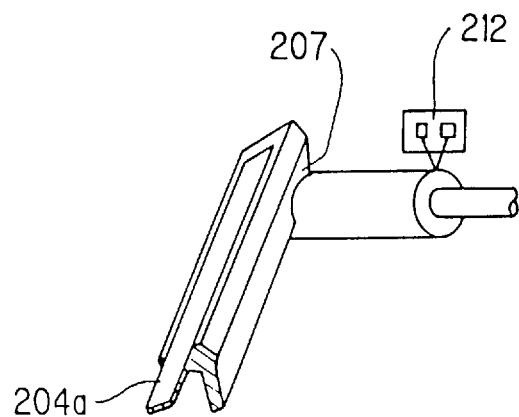
FIG. 3 is an explanatory view showing detection by a home position sensor.

When the first carriage 207 is at the home position shown in FIG. 2, the first carriage 207 is detected by a home position sensor 212, which is a mirrored type of photo sensor. The home position sensor 212 detects the first carriage 207 as shown in FIG. 3. In this figure, if the first carriage 207 is driven rightward for exposure scanning and is off from the home position, the home position sensor 212 enters the state in which it can not detect light (the first carriage 207 is not detected). On the other hand, when the first carriage 207 returns to the home position, the home position sensor 212 receives light (the first carriage 207 is detected), and when the home position sensor 212 changes from the state where it receives light to the state where it does not receive any light, movement of the first carriage 207 is stopped.

Referring to FIG. 1 herein, outputs from the CCD 108r, 108g, and 108b are subjected to analog/digital conversion as well as to necessary processing by the image processing unit 103, and are converted to two-valued signals for recording and energizing for black (BK), yellow (Y), magenta (M), and cyan (C), which are record color data, respectively. The two-valued signals are then inputted into the laser drivers 117bk, 117y, 117m, and 117c, and the laser drivers energize semiconductor lasers 116bk, 116y, 116m, and 116c, which outputs laser beams modulated according to the record color signals (two-valued signals).

The emitted laser beams are reflected, as shown in FIG. 2, by rotational polyhedron mirrors 213bk, 213y, 213m, and 213c, pass through the f-θ lenses 214bk, 214y, 214m and 214c, reflected by fourth mirrors 215bk, 215y, 215m, and 215c as well as by fifth mirrors 216bk, 216y, 216m, and 216c, pass through the polyhedron mirror surface fall correcting cylindrical lenses 217bk, 217y, 217m, and 217c, and are focused onto light-sensing drums 218bk, 218y, 218m, and 218c.

The rotational polyhedron mirrors 213bk, 213y, 213m, and 213c are fixed to rotation shafts of the polyhedron mirror driving motors 219bk, 219y, 219m, and 219c. The polyhedron mirror driving motors 219bk, 219y, 219m, and 219c rotates at a constant speed respectively and drives and rotates the rotational polyhedron mirrors 213bk, 213y, 213m, and 213c at a constant speed respectively. When the rotational polyhedron mirrors 213bk, 213y, 213m, and 213c rotate, the laser beams described above moves for scanning in the direction perpendicular to the rotational direction of the light-sensing drums 218bk, 218y, 218m, and 218c (clockwise), namely along each of the drum shafts of the light-sensing drums 218bk, 218y, 218m, and 218c.

Figure 4:
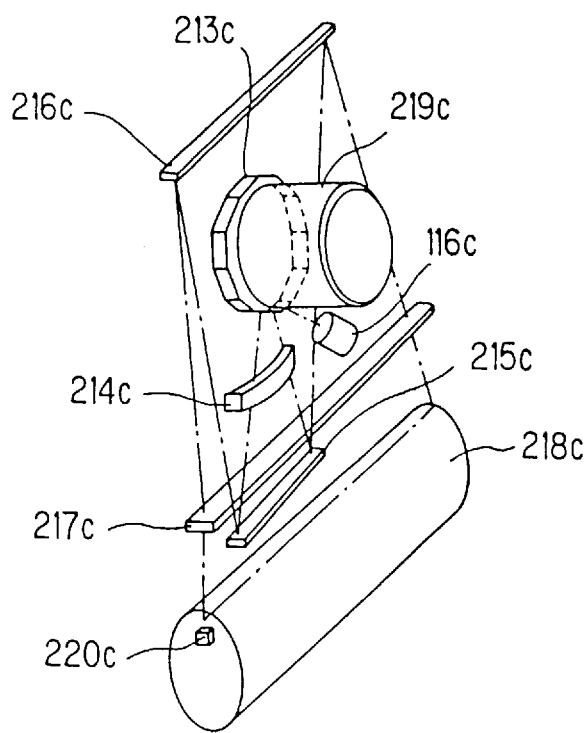
FIG. 4 is an explanatory view showing a laser scanning system in a cyan color recording unit.

Next detailed description is made for a laser scanning system in a cyan color recording device with reference to FIG. 4. As described above, the reference numeral 116c indicates a semiconductor laser. In one edge section in the laser scanning direction (two-dot mirror line) along a shaft of the light-sensing drum 218c, a sensor 220c comprising a photoelectric conversion element is provided so that the sensor 220c can receive laser beams, and at a point of time when the sensor 220c detects a laser beam and changes its state from the one in which it detects the laser beam to the one in which it does not detect the laser beam, a starting point for 1-line scanning is detected. Namely, a laser beam detection signal (pulse) from the sensor 220c is treated as a line synchronizing pulse for laser scanning. Configuration of each of a magenta recording unit, a yellow recording unit, and a black recording unit is completely the same as that of the cyan recording unit in FIG. 4.

Again description is made with reference to FIG. 2. Surfaces of the light-sensing drums 218bk, 281y, 218m and 218c are homogeneously electrified by charge scolotrons 221bk, 221y, 221m and 221c connected to a light-voltage generating device for negative voltage (not shown). When a laser beam modulated according to a recording signal is irradiated onto the surfaces of the light-sensing bodies homogeneously electrified, an electric charge on the surfaces flows to a grounding of a basic body of each drum due to the photo-conduction phenomenon and disappears. Herein the laser beam is not flickered in a high density section of a document, and is flickered in a low density section of the document. With this operation, sections on the surfaces of the light-sensing drums 218bk, 218y, 218m, and 218c corresponding to high density sections of the document are electrified to a potential of −800 V, and sections on the surfaces corresponding to low density sections of the document to around −100 V. Namely, electrostatic latent images are formed according to high and low density sections of the document. This electrostatic latent images are developed by a black development unit 222bk, a yellow development unit 222y, a magenta development unit 222m, and a cyan development unit 222c, and black, yellow, magenta, and cyan toner images are formed on the light-sensing drums 218bk, 218y, 218m, and 218c, respectively.

It should be noted that the toner in each of the black development unit 222bk, yellow development unit 222y, magenta development unit 222m, and cyan development unit 222c is electrified to positive potential when agitated. Also the black development unit 222bk, yellow development unit 222y, magenta development unit 222m, and cyan development unit 222c are biased by a development bias generating unit (not shown) to around −200 V, the toner is deposited at a place where a surface potential of the light sensing body is more than the biased potential, and thus a toner image corresponding to the document 201 is formed there.

On the other hand, recording paper accommodated in a transfer paper cassette 223 is fed out according to a paper-feeding operation of a feed roller 224, and is sent to a transcription belt 226 at a specified timing. The recording paper placed on the transcription belt 226 moves under the light-sensing drums 218bk, 218y, 218m, and 218c, as shown in FIG. 2, according to movement of the transcription belt 226, and while the recording paper is moving under the light-sensing drums 218bk, 218y, 218m, and 218c, black, yellow, magenta, and cyan toner images are successively transcribed by charge scolotrons 221bk, 221y, 221m and 221c onto the recording paper under the transcription belt 226. Then the recording paper with toner images transcribed thereon is sent to a thermally fixing unit 227, where the tone is fixed to the recording paper, and the recording paper is discharged to a tray 228. On the other hand, residual toner left on a surface of each light-sensing body after transcription is removed by the cleaner units 229bk, 229y, 229m, and 229c.

The cleaner unit 229bk with black toner stored therein and the black development unit 222bk are connected with a toner recovery pipe 230 so that the black toner collected by the cleaner unit 229bk is recovered into the black development unit 222bk. It should be noted that toners in different development units in the front stage of the cleaner unit 229y, 229m, and 229c are mixed in yellow, magenta, and cyan toners collected by the cleaner units 229y, 229m, and 229c because of reverse-directional transcription from the recording paper to the light-sensing drums 218y, 218m, and 218c or for other reasons, so that the toners are not recovered to be used again.

It should be noted that the black development unit 222bk, yellow development unit 222y, magenta development unit 222m, and cyan development unit 222c have toner density sensors 231bk, 231y, 231m, and 231c respectively, and signals corresponding to toner densities in the black development unit 222bk, yellow development unit 222y, magenta development unit 222m, and cyan development unit 222c are issued to a toner density control unit (not shown). The toner density control unit issues a toner supply signal for each color independently to drive toner supply motors (not shown) provided in the block development units 222bk, yellow development unit 222y, magenta development unit 222m, and cyan development units 222c according to outputs from the toner density sensors 231bk, 231y, 231m, and 231c for the purpose to supplement toners consumed for forming toner images and also to keep a toner density in each of the black development unit 222bk, yellow development unit 222y, magenta development unit 222m, and cyan development unit 222c at a constant level. Toner supply rollers 232bk, 232y, 232m, and 232c are fixed to rotational shafts of the toner supply motors respectively, and the toner supply rollers move to supply toner to each development unit according to a toner supply signal.

The transcription belt 226 for feeding recording paper from the light-sensing drum 218bk to the light-sensing belt 218c is spanned over an idle roller 233, a driving roller 234, an idle roller 235, and an idle roller 236, and is rotated counterclockwise by the driving roller 234. The driving roller 234 is pivotally supported on a left edge of a lever 238 pivotally supported by a shaft 237. A plunger 239 of a black mode setting solenoid (not shown) is pivotally provided at a right edge of the lever 238. A compression spring 240 is provided between the plunger 239 and the shaft 237, and the compression coil spring 240 gives a clockwise torque to the lever 238.

When the black mode setting solenoid has not been energized (in the color mode), the transcription belt 226, on which recording paper is to be placed, contacts the light-sensing drums 218bk, 218y, 218m, and 218c. In this state, when recording paper is placed on the transcription belt 226 and toner images are formed on all the light-sensing drums 218bk, 218y, 218m, and 218c, each toner image is transcribed onto the recording paper in association with movement of the recording paper (color mode). On the other hand, when the black mode setting solenoid is energized (black mode), a lever 238 rotates counterclockwise against a repelling force of a compression coil spring 240, the driving roller 234 descends by 5 mm, the transcription belt 226 goes away from the light-sensing drums 218y, 218m, and 218c, while it is kept contacting to the light-sensing drum 218bk. In this state, the recording paper on the transcription belt 226 contacts only the light-sensing drum 218bk, so that only the black toner image is transcribed onto the recording paper (black mode).

The recording paper does not contact the light-sensing bodies 218y, 218m, and 218c, so that deposited toner (residual toner) on the light-sensing drums 218y, 218m, and 218c is not transferred to the recording paper, so that stain by the yellow, magenta, and yellow toners never occurs on the recording paper. Namely in the black mode, a copy similar to that provided by an ordinary monochrome black color copying machine can be obtained.

Figure 5:
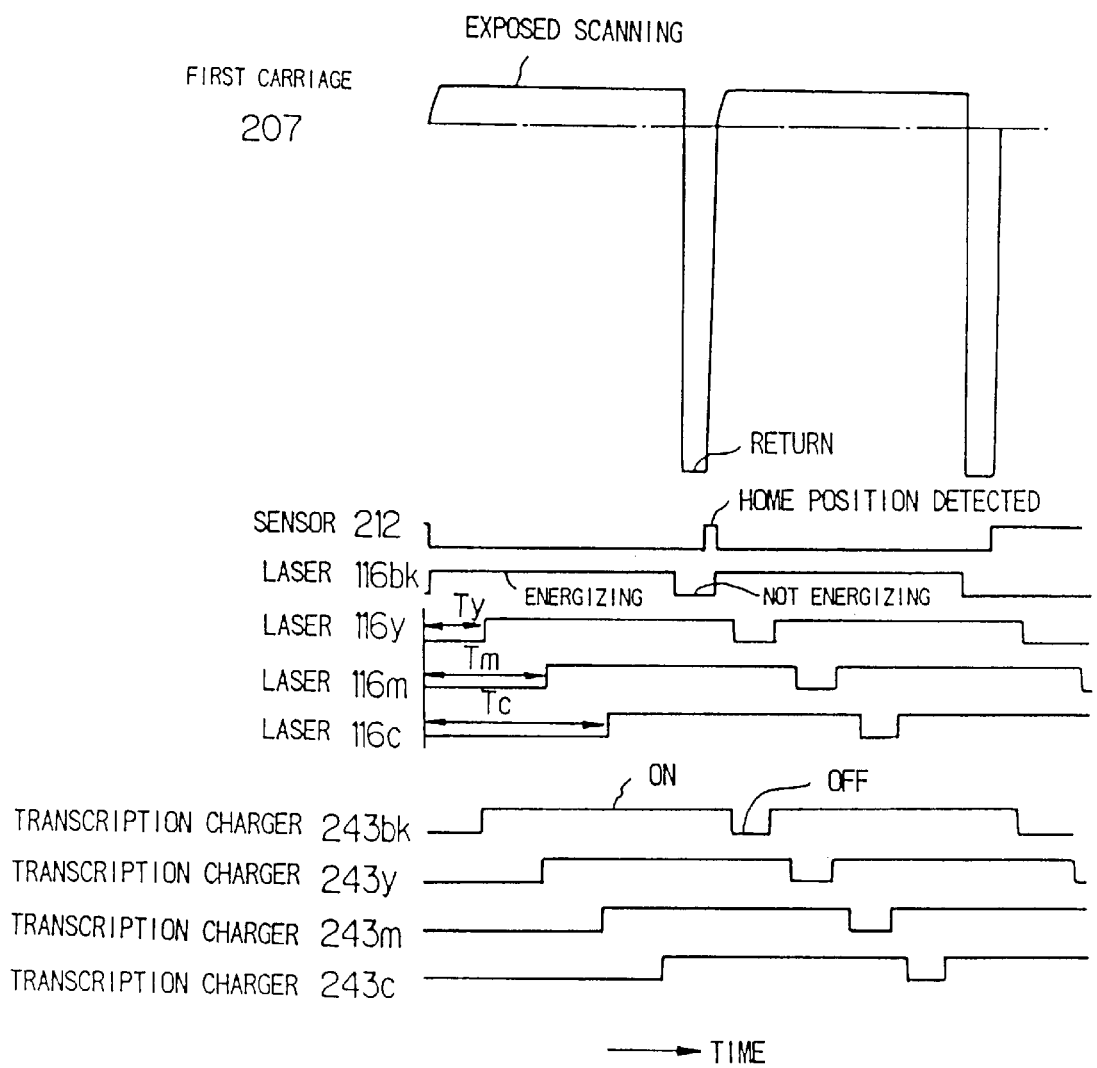
FIG. 5 is an explanatory view showing a timing chart when two sheets of identical full color copies are prepared.

Next description is made for operational timing of main sections of a copying machine with reference to FIG. 5. FIG. 5 is a timing chart for preparation of two sheets of identical colored copy. When exposure and scanning by the first carriage 207 is started, at first, a black color density reference plate 241 and a write color density reference plate 242 shown in FIG. 2 are read, and shading correction is carried out according to the read densities. Next modulated energizing for the laser 116bk according to a record signal is started at the almost same timing as that of scanning on a document placement section, and the modulated energizing is started with time delays of Ty, Tm, and Tc equivalent to period of time required for the transcription belt 226 to move by the distance of the lasers 116y, 116m and 116c respectively. Chargers 243bk, 243y, 243m and 243c each for transcription are energized with a specific time delay respectively (a period of time required for sections irradiated by a laser beam on the light-sensing drums to reach the transcription chargers 243bk, 243y, 243m, and 243c respectively) from a point of time when modulated energizing by the semiconductor lasers 116bk, 116y, 116m, and 116c is started respectively.

Figure 6:
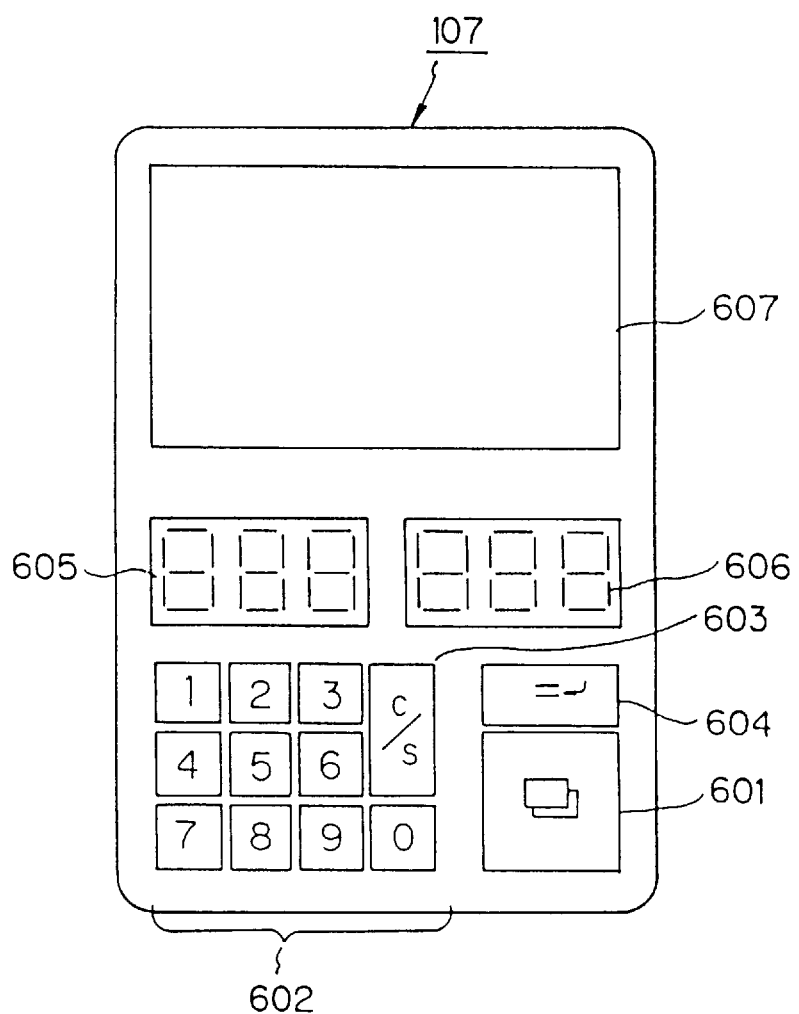
FIG. 6 is an explanatory view showing appearance of a console board.

Next description is made for the console board 107 with reference to the related drawings. FIG. 6 shows appearance of the console board 107. External appearance of the console board 107 comprises a copy start key 601, a ten-key 602, a clear stop key 603, an interrupt key 604, a set sheet number display unit 605, a copy sheet number display unit 606, and a touch panel display 607. The touch panel display 607 has a panel with a number of transparent contact detect switches provided on a screen of a display unit, and the display section and input section are integrated to each other. Concretely, selection of various types of operation modes, display of input guidance is association with the selection above, and display of selected operation mode are executed with or provided on the touch panel display.

Figure 7:
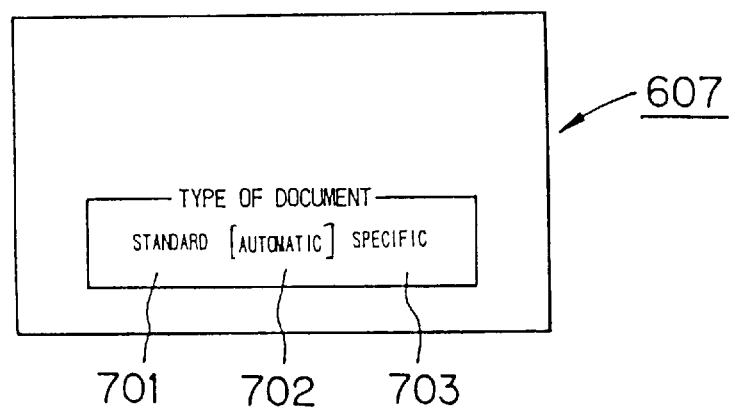
FIG. 7 is an explanatory view showing displays for selecting a type of a document in touch panel display.

Also on the touch panel display 607, a screen for selection of document types as shown in FIG. 7 can be displayed. FIG. 7 is a view showing a display for selection of a document type with the touch panel display 607. Herein the standard display section 701, automatic display section 702, and specified display section 703 are areas for selecting a standard processing mode for executing a processing suited to a standard color material or for automatically checking a result of color material processing and selecting a processing mode suited to the type respectively, and the system control unit 106 enters each operation mode when depression of a particular display section is detected.

In the state where the automatic processing mode has been selected by pressing down the automatic display section 702, when the copy start key 601 is pressed down, the system control unit 106 controls the read/processing unit 101 or other necessary sections so that the ordinary operation for reading a document is executed, and reads out the read color gradation signals R, G, and B sampled by the sampling unit 102 to determine a type of the color material. It should be noted that, in Embodiment 1, the document read operation is not executed prior to a copying operation in the automatic processing mode, and the copying operation is immediately started.

Figure 8:
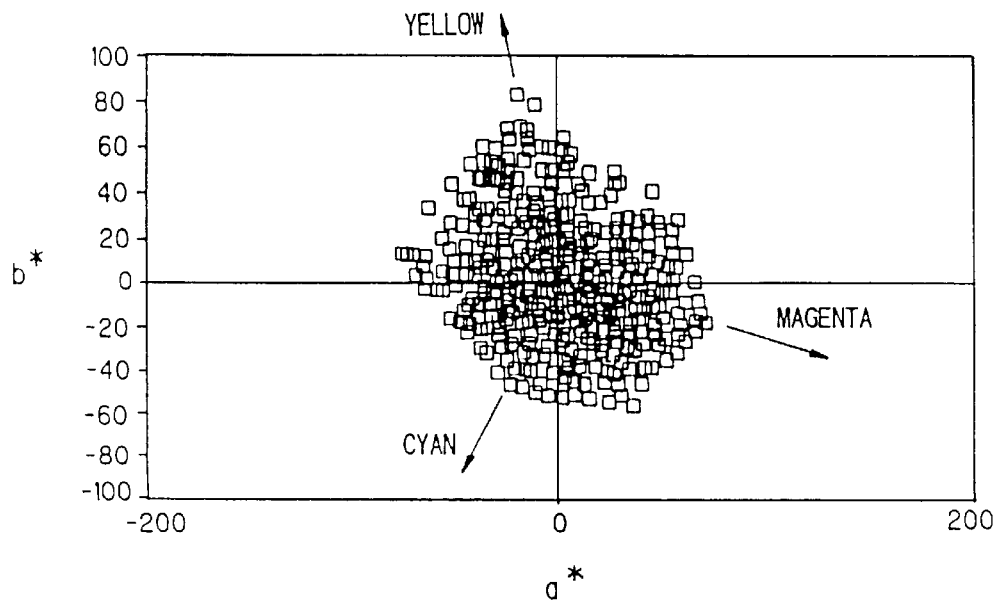
FIG. 8 is an explanatory view showing a range of color reproduction.

Determination on a type of a color material is executed, for instance, as described below. A chrominance distribution of colors expressed by the read color gradation signals R, G, and B read out as described above takes, for instance, a form of color distribution in the a*–b* space after conversion to the CIELAB display color system as shown in FIG. 8. FIG. 8 shows a range of color reproduction. Herein, features of a type of a color material appear in distribution near cyan, magenta, and yellow sections which are the three elementary colors. Of the three elementary colors, a phase and a chrominance of a color having the highest chrominance vary according to a type of a color material.

The system control unit 106 searches colors having the highest chrominance respectively for the three elementary colors in the chrominance distribution, and compares the color phase and chrominance to data in a data base for color material previously stored in the ROM 119. A color material most matching the detected parameters is determined as the one actually used for the document. It should be noted that a color material for each of cyan, magenta, and yellow are generally not selected and used one by one, but is previously selected as a combination of the three elementary colors, for instance, like a sensitive paper. For this reason, by assessing a matching degree as a combination of the three elementary colors, determination of a color material can be performed more precisely.

Figure 18A:
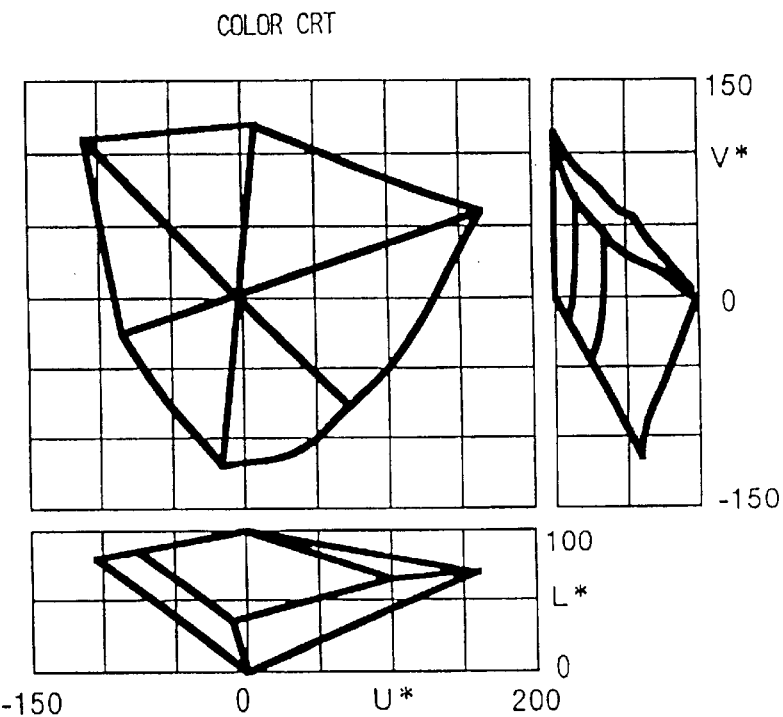
FIGS. 18A and 18B are explanatory views showing a range of color reproduction for each image output device (each document type)
Figure 18B:
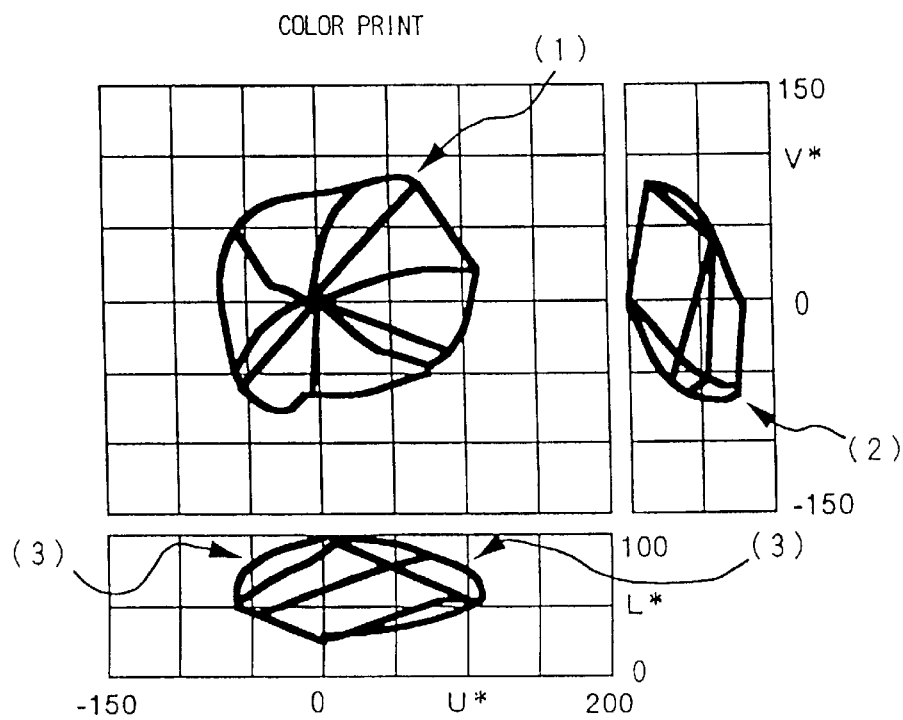
Figure 19A:
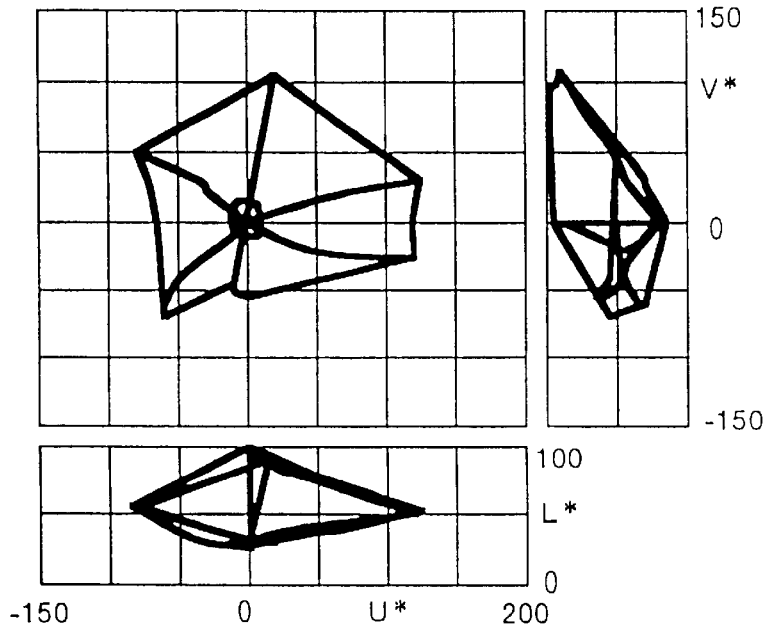
FIGS. 19A and 19B are explanatory views showing a range of color reproduction for each image output device (each document type)
Figure 19B:
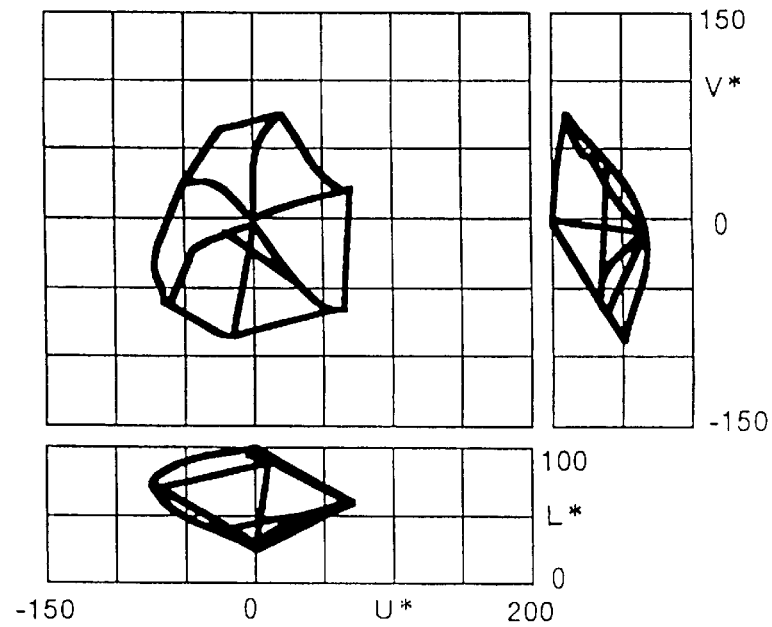
Figure 20:
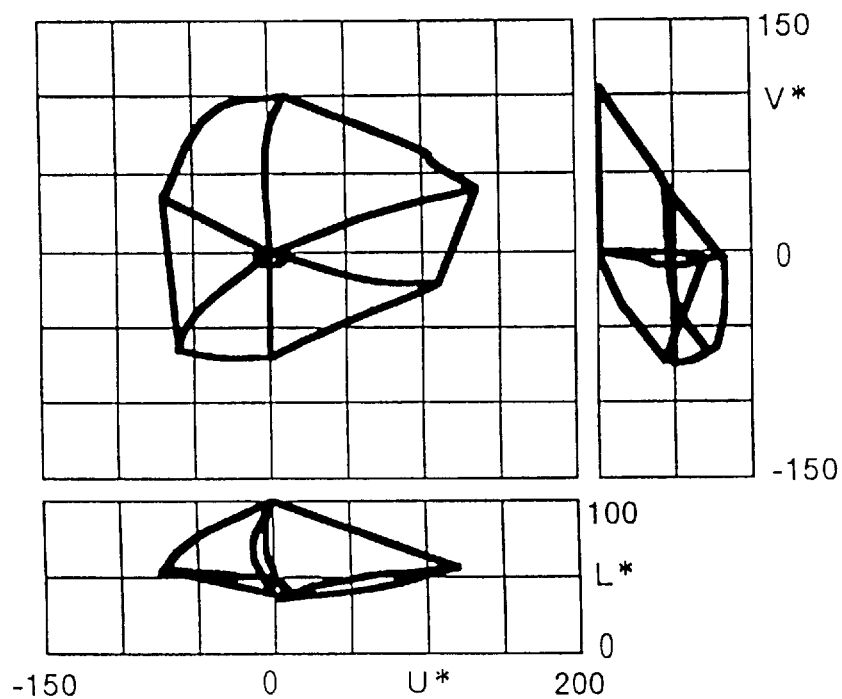
FIG. 20 is an explanatory views showing a range of color reproduction for each image output device (each document type)

FIG. 18A and 18B and FIG. 19A and 19B are explanatory views each showing a range of color reproduction for each image output device (each document type). FIG. 18A shows a color CRT; FIG. 18B is a silver salt photograph, FIG. 19A shows an offset print, FIG. 19B shows a ink jet printer; and FIG. 20 shows a sublimation-type of heat transfer printer.

A color of a document is distributed inside a range of color reproduction, so that it is possible to determine an image output device (a type of a document) by detecting a characteristic portion of the color reproduction range. For instance, in a case of the silver salt photograph shown in FIG. 18B, there are the following characteristics as compared to the offset print shown in FIG. 19A. Namely, it may be said as follows:

At first, as shown in (1) of FIG. 18B, yellow having higher chrominance (v* is larger in the direction of +) is displaced to the red side (in the + direction for u*).

Second, as shown in (2) of FIG. 18B, a range of reproduction of blue-purple color with low brightness (v* is larger in the direction of –, and L* is smaller).

Third, as shown in (3) of FIG. 18B, a reproduction range of green and red colors having high brightness (u* is larger in the directions of + and L* is larger) is wide.

Figure 9:
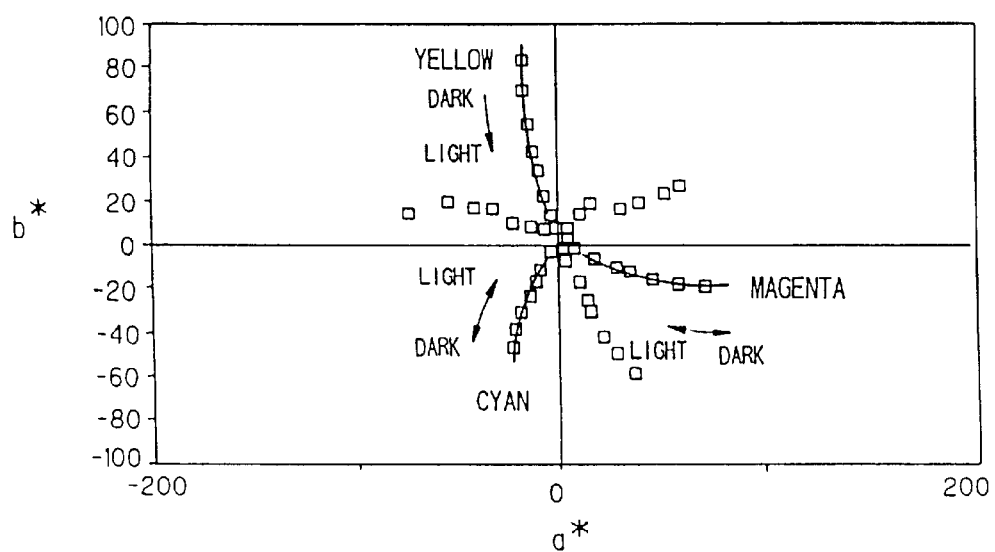
FIG. 9 is an explanatory view showing the fact that a color phase and chrominance may change according to recording density even in the same color material.

The above description assumes a case where determination is made by checking a color phase and chrominance, but as shown in FIG. 9, a color phase and chrominance change even in the same color material according to a density of record. FIG. 9 shows the fact that a color phase and chrominance may change according to a density of a record even with the same color material. For this reason, by determining a color material taking into considerations not only a color phase and chrominance, but also the color's brightness, more accurate determination of a color material can be executed.

It should be noted that search for a color with the highest chrominance may be executed by a function of some hardware such as the sampling unit 102, not by a program in the system control unit 106.

When determination of a type of a color material is finished, the system control unit 106 sets processing conditions previously specified in the image processing unit 103 according to the color material's type determined as described above. Setting executed in this step includes, for instance, change of a processing coefficient for the masking processing executed in the color correction circuit 112 which is a color correcting means.

It should be noted that the processing executed by the color correction circuit 112 is not limited to the masking processing, and that the circuit can also be used for interpolation or for using an LUT (look-up table). Also in association with determination on a type of a color material, also determination can be performed as to whether a document is a silver salt photograph one or a screen tone photograph one, so that, for instance in a case where a color material used for a screen tone photograph document is detected, it is possible to execute setting such as adding a processing for removing moire due to screen dots.

Next, the system control unit 106 controls a copying operation at a timing as shown in FIG. 5, and discharges a copy according to setting by the image processing unit 103.

As described above, in Embodiment 1, the image processing unit 103 can execute an optimal color correction processing according to a type of a color material used for a document to an image signal outputted from the read/processing unit 101.

It should be noted that, in the method as described above, as an operation for reading a document is generally executed prior to an actual copying operation to determine a type of a color material used for the document, times of the reading operation increases by one in the automatic processing mode and a period of time required from a point of time when the copy start key is pressed down until a point of time when a copy is discharged becomes longer. In Embodiment 1, however, it is possible to specify the standard processing mode or specific processing mode in which an operation for reading a document prior to start of an actual copying operation is not required, and for this reason, even if it is required to shorten a period of time required for copying a document, the need is satisfied by selecting any of these modes.

Also in the automatic processing mode, an operation for reading a document prior to a copying operation is not executed, and the copying operation is started immediately. Namely, by setting processing conditions suited to a standard color material when a copying operation is started, determining a type of the color material according to the read color gradation signals R, G, and B sampled from a tip section of the document, and switching the processing condition during the operation, the automatic processing mode not causing the time-related problems as described above can be realized.

Also description of Embodiment 1 assumes a case where an ordinary document read operation is executed and read color signals R, G, and B are sampled, but it is needless to say that the read color gradation signals R, G, and B may be sampled and used for determination of a type of a color material after a document read operation is executed under different illuminating conditions or different color separating conditions.

Configuration in Embodiment 2 of the present invention is almost the same as that in Embodiment 1, and a document illuminating means having a plurality of illumination sources each driven independently and having different light-emitting characteristics is provided therein. For this reason, description is made only for the different portions herein.

Figure 10:
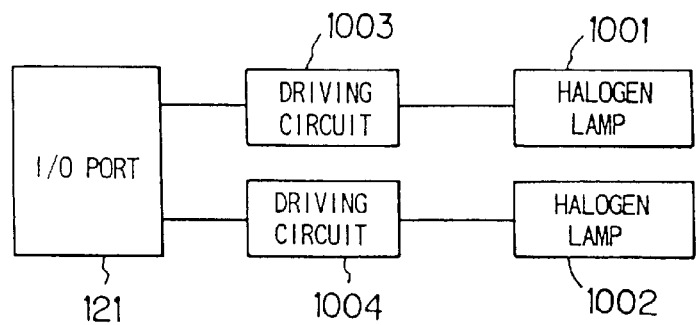
FIG. 10 is a block diagram showing partial configuration of a digital copying machine according to Embodiment 2 of the present invention.

In Embodiment 2, the halogen lamps 203*a*, 203*b* used for illuminating a document in FIG. 2 are replaced with halogen lamps 1001, 1002 each having a different color temperature, and the lamps can be driven independently as shown in FIG. 10. FIG. 10 is a block diagram showing partial configuration of a digital copying machine according to Embodiment 2 of the present invention. The halogen lamp 1001 is driven by a driving circuit 1003, and the halogen lamp 1002 is driven by the driving circuit 1004. The driving circuits 1003, 1004 are connected through an I/O port 121 to the system control unit 1006, and operates according to a signal issued from the system control unit 106.

Figure 11:
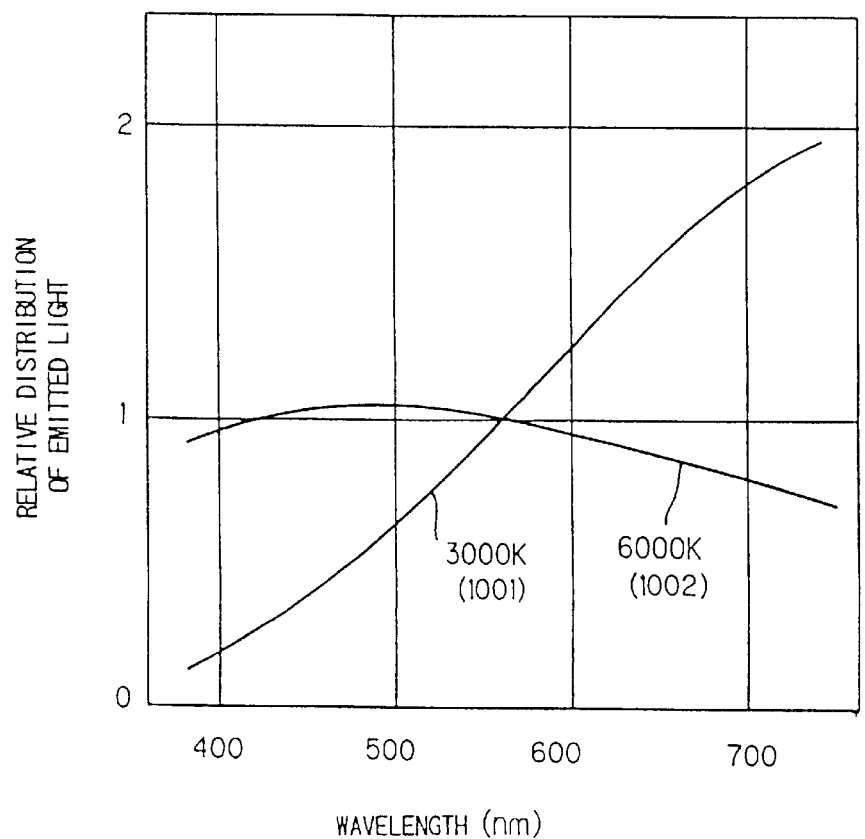
FIG. 11 is an explanatory view showing a relative light emission distribution in a halogen lamp.

The read color gradation signals R, G, and B sampled by the system control unit 106 are read and stored respectively. In this case, relative distributions of light emitted from the halogen lamps 1001, 1002 becomes as shown in FIG. 11 due to difference of color temperature, so that even the read color gradation signals R, G, B obtained by sampling the same point on a document are read out as different values due to effects by a relative distribution of light emitted from the halogen lamp. It should be noted that FIG. 11 is a view showing relative distributions of light emitted from the halogen lamps 1001, 1002. This change is specific to a type of a color material used for a document, namely to a spectrographic reflection factor of a color material, so that the system control unit 106 can determine a type of a color material by comparing deviation in actual signals from data for color materials previously prepared and assessing it.

It should be noted that an illumination source for illuminating a document is not limited to the halogen lamps 1001, 1002 and, for instance, fluorescent lamps may be used on the conditions relative distributions of emitted light are different, and that different types of light source such as a halogen lamp and fluorescent lamp may be combined. Also, by using three or more types of illumination sources each having a different light emission characteristics and comparing and assessing changes of the read color gradation signals R, G, and B respectively, it is possible to more precisely determine a type of a color material.

As described above, with Embodiment 2 of the present invention, the system control unit 106 uses halogen lamps 1001, 1002 each having a different color temperature and executes a document read operation twice by lighting up the halogen lamps and also processes the read color gradation signals R, G, B sampled by the sampling unit 102, so that it can determine a type of a color material more precisely.

Configuration of Embodiment 3 of the present invention is almost the same as that of Embodiment 1, and a document illuminating means having an illumination source which can emit light in a plurality of driving mode each having different light emission characteristics is provided therein. For this reason, description is made herein for only the different points.

Figure 12:
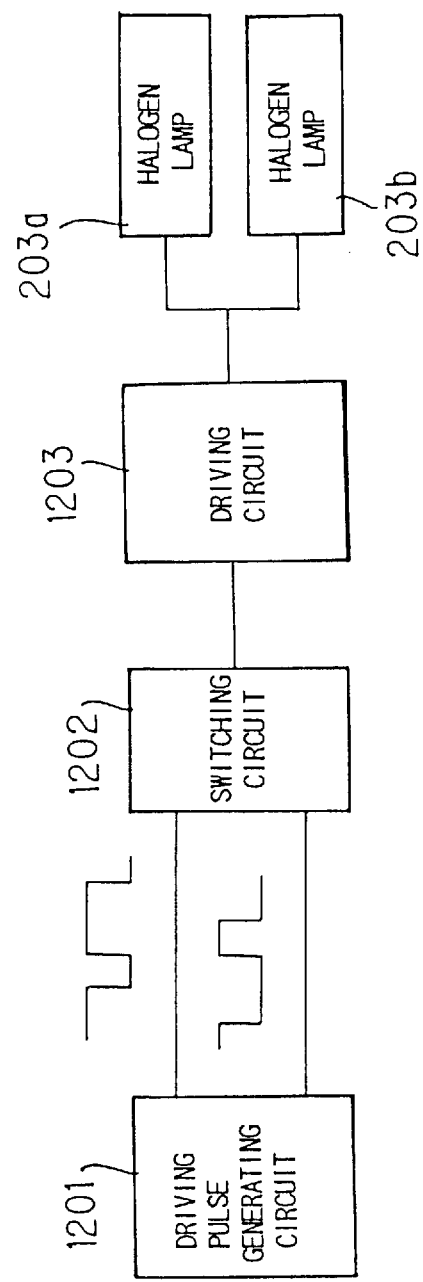
FIG. 12 is a block diagram showing an example of a digital copying machine according to Embodiment 3 of the present invention.

FIG. 12 is a block diagram showing partial configuration of a digital copying machine according to Embodiment 3 of the present invention. A color temperature of halogen lamps 203*a*, 203*b* may be generated by making use of power used when driving the halogen lamps 203*a*, 203*b*. A digital copying machine, in which the power used for driving the halogen lamps 203*a*, 203*b* can be controlled for a color temperature is, for instance, as shown in FIG. 12. The digital copying machine according to Embodiment 3 comprises a driving pulse generating circuit 1201 for generating two types of different driving pulses each having a different duty (power), a switching circuit 1202 for switching the driving pulses, a driving circuit 1203 for driving the halogen lamps 203*a*, 203*b* according to an operation of the switching circuit 1202.

Although not shown herein, the switching circuit 1202 and driving circuit 1202 are connected to the system control unit 106, operate according to a signal from the system control unit 106, and can change a color temperature of each of the halogen lamps 203a, 203b.

As described above, with Embodiment 3, the system control unit 106 executes a document read operation twice by lighting up the halogen lamps 203a, 203b with a different duty respectively and processes the read color gradation signals R, G, B sampled by the sampling unit 102, so that it can determine a type of a color material more precisely.

Also by realizing the configuration like that in Embodiment 3 in which a document illumination source is shared and a driving mode of a document illumination source is switched according to a type of a color material, it becomes easier to reduce a number of parts and also it become possible to provide a color input apparatus with cheaper cost as compared to a color input apparatus like in Embodiment 2 in which a plurality of document illumination sources each having a different relative distribution of emitted light are prepared.

Also in a digital copying machine which operates according to the timing chart as shown in FIG. 5, image formation for a sheet of copy is finished by scanning the document once, but in a digital copying machine having the color image input apparatus according to the present invention, image formation may be executed by scanning the document 3 or 4 times. Especially by executing common processing not dependent on a type of a color material when a black image is formed in the first scan and also executing processing for a type of a color material used for the document, it is possible to realize a digital copying machine in which a period of time from a point of time when the copy start key 602 is pressed down until a point of time when the copy is discharged does not change and which has a excellent capability for reproducing write color.

Configuration of Embodiment 4 of the present invention is basically the same as that in Embodiment 1, so that description is made herein only for different points.

Figure 13:
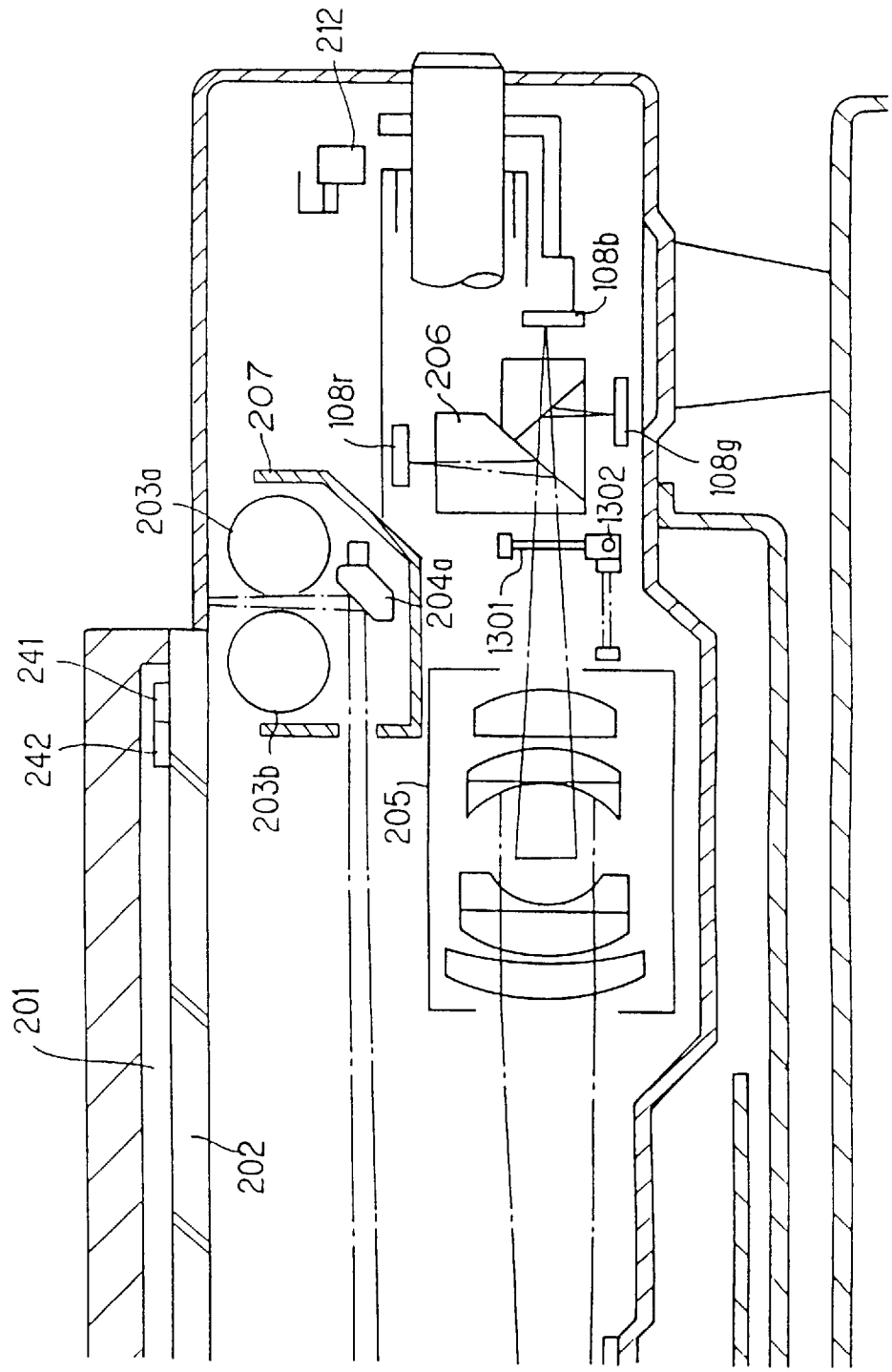
FIG. 13 is a block diagram showing a portion of a digital copying machine according to Embodiment 4 of the present invention.

In Embodiment 4, as shown in FIG. 13, a filter 1301 having not-flat spectrographic transmission characteristics is inserted in a light path for the CCD focusing system shown in FIG. 2. It should be noted that FIG. 13 shows partial configuration of the digital copying machine and FIG. 14 shows a relative transmission factor of the filter 1301.

As shown in FIG. 13, the filter 1301 is rotatably attached with a shaft 1302 as a rotation shaft, and enables the color separation characteristics of the dichroic prism 206 by switching between the state where reflected light inputted into the dichroic prism 206 can pass through the filter 1301 and the state where the reflected can not pass therethrough. Namely the system control unit 106 executes a document read operation twice by switching the state of the filter 1301, reads and stores the read color gradation signals R, G, B sampled by the sampling unit 102 respectively. Also in this case, like in Embodiment 2, even the read color gradation signals R, G, B obtained by sampling the same point on a document are read as different values respectively due to influence of the color separation characteristics. This change is specific to a type of a color material used for a document, namely to the spectrographic reflection factor of the color material, so that, by comparing the change to color material database previously prepared and assessing it, the system control unit 106 can determine a type of the color material.

It is needless to say that two or more types of filter 1301 may be inserted into the light path, and that, by comparing and assessing changes of the read color gradation signals R, G, and B respectively, more accurate determination of a color material's type becomes possible.

A description of Embodiment 4 above assumes a case where a document read operation is executed by separating reflected light from a document to three colors, but it is needless to say that the reflected light may be separated to five or more colors for reading a document to determine a type of a color material used for the document.

In Embodiment 5, in addition to configuration of Embodiment 1, furthermore a spectrographic means for separating reflected light from a document illuminated by the halogen lamps 203a, 203b with the spectrographic characteristics different from those of the dichroic prism 206 is provided, which receives the reflected light subjected to color separation by the spectrographic manes and subjects the light to photoelectric conversion, read the converted light as an image signal, determines a type of a color material used for the document according to the read image signal, and executes color correction processing according to a result of determination above. In other words, in place of the configuration of Embodiment 1 in which reflected light from a document is separated to three colors by using the dichroic prism 206, the reflected light is separated to 4 colors by using the dichroic prism 206 and a spectrographic means.

Next description is made for a method of reading a document by separating reflected light to 4 or more colors. FIG. 15 shows configuration of a digital copying machine according to Embodiment 5 in which light reflected from a document is separated to 4 colors.

As shown in FIG. 15, a half mirror 1501 is inserted in a light path in a CCD focusing system, and a portion of the reflected light from a document to the dichroic prism 206 is introduced via a filter 1502 into the CCD 1503. Namely the half mirror 1501 and the filter 1502 forms the spectrographic means according to Embodiment 5 of the present invention.

Herein the spectrographic transmission characteristics of the filter 1502 is the spectrographic characteristics X which is different from the spectrographic characteristics R, G, B by the dichroic prism 206 as shown in FIG. 16. FIG. 16 shows the relative transmission factor in Embodiment 5.

Figure 17:
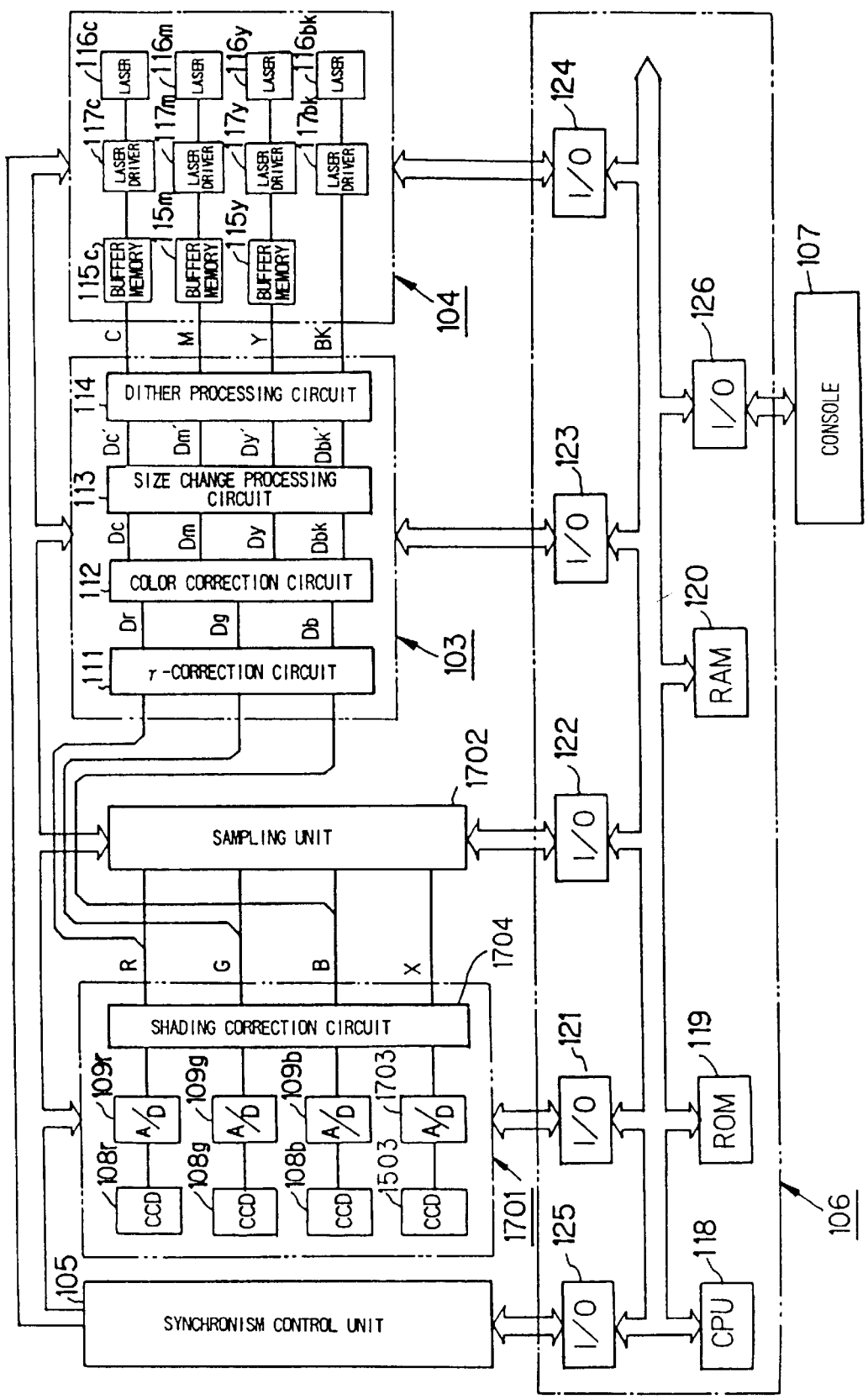
FIG. 17 is a block diagram showing the digital copying machine according to Embodiment 5.

Next description is made for the digital copying machine according to Embodiment 5 with reference to FIG. 17. FIG. 17 is a block diagram showing configuration of the digital copying machine according to Embodiment 5. The digital copying machine comprises a read/processing unit 1701 for reading a document image and outputting read color gradation signals red (R), green (G), blue (B), and a particular color (X) which is a fourth color, a sampling unit 1702 for sampling a document, an image processing unit 103 for receiving the read color gradation signals R, G, B from the read/processing unit 1701 and subjecting the signals to image processing, an image recording unit 104 for storing an image therein, a synchronism control unit 105 for insuring synchronism in signal transaction between a read/processing unit 1701, a sampling unit 1702, the image processing unit 103 and image recording unit 104 and among operational elements in each unit, a system control unit 106 for controlling the entire copying machine, and a console board 107 having a display section and a key section and controlling operations of the entire copying system.

Next description is made for detailed configuration of the read/processing unit 1701 different from that in Embodiment 1 with reference to the related drawings. The read/processing unit 1701 comprises a CCD 108 for reading an image, an A/D converter 109 for converting analog image data read by the CCD 108 to digital one, and a shading correction circuit 1704. It should be noted that the CCD 108 has, in addition to the CCD 108r for reading read, CCD 108g for reading green, and CCD 108b for reading blue, a CCD 1503 for reading a particular color (X).

Also like the CCD 108, the A/D converter 109 comprises an A/D converter 109r for reading read, an A/D converter 109g for reading green, an A/D converter 109b for reading blue, and furthermore an A/D converter 1703.

As described above, the read color gradation signals read by the CCD 1503 are converted by the A/D converter 1703 to digital signals. Furthermore the read color gradation signals converted to digital signals are subjected in the shading correction circuit 1704 to correction in relation to non-uniformity of illumination in the CCD read optical system as well as to non-uniformity in sensitivity of a light-receiving element group inside the CCD and dark potentials and are sampled by the sampling unit 1702.

With the configuration as described above, it is possible to execute a document read operation by separating reflected light from a document to 4 colors and to sample the outputted read color gradation signals R, G, B, and X.

In this embodiment, the system control unit 106 is connected via the I/O port 121 to the read/processing unit 1701, reads out the read color gradation signals R, G, B, and X sampled by the sampling unit 1702 connected thereto via the I/O port 122, and determines a type of a color material. Determination of a color material's type is executed as described below.

In the spectrographic characteristics X of the filter 1502 shown in FIG. 15, the transmission band is narrower as compared to a case where reflected light is separated by the dichroic prism 206, and mainly light at an almost intermediate color between green (G) and blue (B) can pass through the filter 1502. Herein the green (G) and blue (B) lights are absorbed by color materials for magenta (M) and yellow (Y) respectively, but a degree of absorption varies according to a type of a color material respectively.

For this reason, also the relation between the read color gradation signals R, G, B and X is specific to a type of a color material, and the system control unit 106 determines a color material's type by making use of the features as described above. For instance, from a number of combinations of read color gradation signals R, G, B, and X, for instance, a combination in which it is guessed that a color material for magenta (G) is used in the state similar to the single color is searched out, the combination is compared to data base for color materials for magenta previously prepared, and a color having the closest characteristics is determined as a color material used for the document. In addition, more precise determination can be executed by executing also color materials for yellow and making a comprehensive determination taking into considerations also a result of determination on magenta.

As described above, with Embodiment 5 of the present invention, if determination on a color material's type is executed by separating reflected light from a document to 4 or more colors, as only one scan is required to determine a type of the color material, a period of time until completion of determination on a color materials type becomes shorter as compared to a case where an document read operation is executed under different illuminating conditions or under different conditions for color separation.

As described above, the color image input apparatus according to the present invention comprises a document illuminating means for illuminating a document; a color separating means for subjecting reflected light from the document illuminated by the document illuminating means to color separation; a document reading means for receiving the reflected light subjected to color separation by the color separating means and subjecting the reflected to photoelectric conversion and reading the light as an image signal; a color material determining means for determining a type of a color material used for the document according to the image signal read by the image reading means; and a color correction processing means for subjecting the image signal read by the image reading means to a color correction processing according to a result of determination of the color material determining means, so that an optimal color correction processing can be executed according to a type of a color material used for the document and a color image input apparatus with improved capability for color reproduction can be provided.

The color image input apparatus according to the present invention comprises a document illuminating means for having a plurality of illumination sources each driven independently and having different illuminating characteristics; a color separating means for subjecting the reflected light from the document illuminated by the document illuminating means to color separation; an image reading means for receiving the reflected light subjected to color separation by the color separating means and subjecting the reflected light to photoelectric conversion and reading the light as an image signal; a color material determining means for driving each of a plurality of illumination sources independently and determining a type of a color material used for the document according to a plurality of image signals read by the image reading means; and a color correction processing means for subjecting the image signals read by the image reading means to a color correction processing according to a result of determination by the color material determining means, so that an optimal color correction processing can be executed according to a type of a color material used for the document and a color image input apparatus with improved capability for color reproduction can be provided.

The color image input apparatus according to the present invention comprises a document illuminating means having an illumination source which can emit light in a plurality of driving modes each having different light-emitting characteristics; a color separating means for subjecting reflected light from the document illuminated by the document illuminating means to color separation; an image reading means for receiving the reflected light subjected to color separation by the color separating means, subjecting the reflected light to photoelectric conversion and reading the light as an image signal; a color material determining means for making the plurality of illumination sources emit light in a plurality of driving modes and determining a type of a color material used for the document according to a plurality of image signals read by the image reading means; and a color correction processing means for subjecting the image signals read by the image reading means to a color correction processing according to a result of determination by the color material determining means, so that an optimal color correction processing can be executed according to a type of a color material used for the document and a color image input apparatus with improved capability for color reproduction can be provided.

The color image input apparatus according to the present invention comprises a document illuminating means for illuminating a document; a color separating means for subjecting reflected light from a document illuminated by the document illuminating means to color separation in a plurality of color separation modes each having different spectrographic characteristics; an image reading means for receiving the reflected light subjected to color separation by the color separating means and subjecting the reflected light to photoelectric conversion and reading the light as an image signal; a color material determining means for determining a type of a color material used for a document according to a plurality of image signals read by the image reading means in the plurality of color separation modes; and a color correction means for subjecting the image signal read by the image reading means to a color correction processing according to a result of determination by the color material determining means, so that an optimal color correction processing can be executed according to a type of a color material used for the document and a color image input apparatus with improved capability for color reproduction can be provided.

The color image input apparatus according to the present invention comprises a document illuminating means for illuminating a document; a color separating means for subjecting reflected light from the document illuminated by the document illuminating means to color separation; a spectrographic means for subjecting the reflected light from the document illuminated by the document illuminating means with spectrographic characteristics different from that of the color separating means; an image reading means for receiving the reflected light subjected to color separated by the color separating means as well as the spectrographic means, subjecting the reflected light to photoelectric conversion, and reading the converted light as an image signal; a color material determining means for determining a type of a color material used for the document according to the image signal read by the image reading means; and a color correction processing means for subjecting the image signal read by the image reading means to a color correction processing according to a result of determination by the color material determining means, so that an optimal color correction processing can be executed according to a type of a color material used for the document and a color image input apparatus with improved capability for color reproduction can be provided.

This application is based on Japanese patent application No. HEI 7-121980 (121980/1995) filed in the Japanese Patent Office on May 19, 1995, and Japanese patent application No. HEI 8-116847 (116847/1996) filed in the Japanese Patent Office on May 10, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A color image input apparatus comprising:

a document illuminating means for illuminating a document;

a color separating means for subjecting reflected light from the document illuminated by said document illuminating means to color separation;

a document reading means for receiving the reflected light subjected to color separation by said color separating means, subjecting the reflected light to photoelectric conversion and reading the light as an image signal;

a color material determining means for determining a type of a color material used for the document according to the image signal read by said image reading means; and a color correction processing means for subjecting the image signal read by said image reading means to a color correction processing according to a result of determination of said color material determining means.

2. A color image input apparatus according to claim 1;

wherein said color material determining means detects a color having the chrominance for each of the three elementary colors from a chromaticity distribution of colors expressed by read gradation signals read by said image reading means, compares each color phase as well as chrominance to a plurality of color data previously stored, and determines the most matching one a color material used for the document.

3. A color image input apparatus according to claim 1;

wherein said color material determining means detects a color having the highest chrominance for each of the three elementary colors from a chromaticity distribution of colors expressed by read gradation signals read by said image reading means, compares a color phase, chrominance, and brightness of each color to a plurality of color material data previously stored, and determines the most matching one as a color material used for the document.

4. A color image input apparatus according to claim 1;

wherein said color material determining means determines a type of a color material used for a document according to a plurality of image signals obtained from the document according to lights each having different characteristics.

5. A color image input apparatus comprising:

a document illuminating means for having a plurality of illumination sources each driven independently and having different illuminating characteristics;

a color separating means for subjecting the reflected light from the document illuminated by said document illuminating means to color separation;

an image reading means for receiving the reflected light subjected to color separation by said color separating means, subjecting the reflected light to photoelectric conversion and reading the light as an image signal;

a color material determining means for driving each of a plurality of illumination sources independently and determining a type of a color material used for the document according to a plurality of image signals read by said image reading means; and a color correction processing means for subjecting the image signals read by said image reading means to a color correction processing according to a result of determination by said color material determining means.

6. A color image input apparatus according to claim 5;

wherein said color material determining means detects a color having the chrominance for each of the three elementary colors from a chromaticity distribution of colors expressed by read gradation signals read by said image reading means, compares each color phase as well as chrominance to a plurality of color data previously stored, and determines the most matching one a color material used for the document.

7. A color image input apparatus according to claim 5;

wherein said color material determining means detects a color having the highest chrominance for each of the three elementary colors from a chromaticity distribution of colors expressed by read gradation signals read by said image reading means, compares a color phase, chrominance, and brightness of each color to a plurality of color material data previously stored, and determines the most matching one as a color material used for the document.

8. An image color input apparatus according to claim 5; wherein said document illuminating means use halogen lamps each having a different color temperature.

9. A color image input apparatus according to claim 5; wherein said document illuminating means is a combination of halogen lamps and fluorescent lamps each having a relative distribution of light emitted therefrom.

10. A color image input apparatus comprising:

a document illuminating means having an illumination source which can emit light in a plurality of driving modes each having different light-emitting characteristics;

a color separating means for subjecting reflected light from the document illuminated by said document illuminating means to color separation;

an image reading means for receiving the reflected light subjected to color separation by said color separating means and subjecting the reflected light to photoelectric conversion and reading the light as an image signal;

a color material determining means for making said plurality of illumination sources emit light in a plurality of driving modes and determining a type of a color material used for the document according to a plurality of image signals read by said image reading means; and a color correction processing means for subjecting the image signals read by said image reading means to a color correction processing according to a result of determination by said color material determining means.

11. A color image input apparatus according to claim 10; wherein said color material determining means detects a color having the chrominance for each of the three elementary colors from a chromaticity distribution of colors expressed by read gradation signals read by said image reading means, compares each color phase as well as chrominance to a plurality of color data previously stored, and determines the most matching one a color material used for the document.

12. A color image input apparatus according to claim 10; wherein said color material determining means detects a color having the highest chrominance for each of the three elementary colors from a chromaticity distribution of colors expressed by read gradation signals read by said image reading means, compares a color phase, chrominance, and brightness of each color to a plurality of color material data previously stored, and determines the most matching one as a color material used for the document.

13. A color image input apparatus according to claim 10; wherein said document illuminating means comprises a driving pulse generating means for generating a plurality of driving pulses each having a different duty and a switching means for switching a driving pulse from said driving pulse generating means, and a color temperature of said illumination source is switched by said switching means.

14. A color image input apparatus comprising:

a document illuminating means for illuminating a document;

a color separating means for subjecting reflected light from a document illuminated by said document illuminating means to color separation in a plurality of color separation modes each having different spectrographic characteristics;

an image reading means for receiving the reflected light subjected to color separation by said color separating means, subjecting the reflected light to photoelectric conversion and reading the light as an image signal;

a color material determining means for determining a type of a color material used for a document according to a plurality of image signals read by said image reading means in said plurality of color separation modes; and a color correction means for subjecting the image signal read by said image reading means to a color correction processing according to a result of determination by said color material determining means.

15. A color image input apparatus according to claim 14; wherein said color material determining means detects a color having the chrominance for each of the three elementary colors from a chromaticity distribution of colors expressed by read gradation signals read by said image reading means, compares each color phase as well as chrominance to a plurality of color data previously stored, and determines the most matching one a color material used for the document.

16. A color image input apparatus according to claim 14; wherein said color material determining means detects a color having the highest chrominance for each of the three elementary colors from a chromaticity distribution of colors expressed by read gradation signals read by said image reading means, compares a color phase, chrominance, and brightness of each color to a plurality of color material data previously stored, and determines the most matching one as a color material used for the document.

17. A color image input apparatus according to claim 14; wherein said color separating means comprises a single or a plurality of filters each having not-flat spectrographic transmission characteristics, and a filter moving means for inserting the filter or filters into a light path, and the color separation characteristics is changed.

18. A color image input apparatus comprising:

a document illuminating means for illuminating a document;

a color separating means for subjecting reflected light from the document illuminated by said document illuminating means to color separation;

a spectrographic means for subjecting the reflected light from the document illuminated by said document illuminating means with spectrographic characteristics different from that of said color separating means;

an image reading means for receiving the reflected light subjected to color separated by said color separating means as well as said spectrographic means, subjecting the reflected light to photoelectric conversion, and reading the converted light as an image signal;

a color material determining means for determining a type of a color material used for the document according to the image signal read by said image reading means; and a color correction processing means for subjecting the image signal read by said image reading means to a color correction processing according to a result of determination by said color material determining means.

19. A color image input apparatus according to claim 18;
wherein said color material determining means detects a color having the chrominance for each of the three elementary colors from a chromaticity distribution of colors expressed by read gradation signals read by said image reading means, compares each color phase as well as chrominance to a plurality of color data previously stored, and determines the most matching one a color material used for the document.

20. A color image input apparatus according to claim 18;
wherein said color material determining means detects a color having the highest chrominance for each of the three elementary colors from a chromaticity distribution of colors expressed by read gradation signals read by said image reading means, compares a color phase, chrominance, and brightness of each color to a plurality of color material data previously stored, and determines the most matching one as a color material used for the document.

21. A color image input apparatus according to claim 18;
wherein said spectrographic means has the spectrographic characteristics featuring a narrower band width for transmission as compared to a case where the spectrographic processing is executed by said color separating means.

* * * * *